(12) United States Patent
Flotte et al.

(10) Patent No.: US 10,854,097 B2
(45) Date of Patent: Dec. 1, 2020

(54) ANTI-COLLISION DEVICE AND RELATED AVIONIC PROTECTION SYSTEM, ANTI-COLLISION METHOD AND COMPUTER PROGRAM

(71) Applicant: THALES, Courbevoie (FR)

(72) Inventors: Laurent Flotte, Toulouse (FR); Ronan Demoment, Toulouse (FR); Stéphane Fleury, Toulouse (FR); Xavier Rueff, Toulouse (FR); Daniel Maulet, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/664,342

(22) Filed: Oct. 25, 2019

(65) Prior Publication Data

US 2020/0135037 A1    Apr. 30, 2020

(30) Foreign Application Priority Data

Oct. 31, 2018  (FR) ...................................... 18 01152

(51) Int. Cl.
  *G08G 5/04*    (2006.01)
(52) U.S. Cl.
  CPC ....................... *G08G 5/04* (2013.01)
(58) Field of Classification Search
  None
  See application file for complete search history.

(56) References Cited

U.S. PATENT DOCUMENTS

| | | | | |
|---|---|---|---|---|
| 4,495,589 A * | 1/1985 | Hirzel | ..................... | G01P 3/806 324/160 |
| 9,519,286 B2 * | 12/2016 | Lacaze | ................. | G05D 1/0038 |
| 2018/0095467 A1 * | 4/2018 | Perrone | ................. | B25J 9/1661 |

FOREIGN PATENT DOCUMENTS

| CN | 108319982 A | 7/2018 |
|---|---|---|
| FR | 2 773 609 A1 | 7/2018 |

OTHER PUBLICATIONS

French Search Report, from the French Patent Office in counterpart French Application No. 1801152, dated Jun. 4, 2019.

* cited by examiner

*Primary Examiner* — Adolf Dsouza
(74) *Attorney, Agent, or Firm* — Arent Fox LLP

(57) ABSTRACT

An anti-collision device of an aircraft including a plurality of sensors, the plurality of sensors including at least two separate sensors, each sensor being configured to respectively deliver its own set of captured data as a function of the proximity of at least one obstruction, the anti-collision device including: at least one data homogenization module configured to transform at least one set of captured data in a corresponding set of unmarked data, each set of unmarked data respectively associated with at least one sensor being made up of a plurality of identical data types from one set of unmarked data to another, and a data processing module configured to generate, from said sets of unmarked data, at least one piece of information representative of the presence or absence of obstruction(s).

9 Claims, 23 Drawing Sheets

| | |
|---|---|
| Moving obstruction | |
| Stationary obstruction | |
| Height of the obstruction | 85    85 |
| Height unknown | XX    XX |
| Distance | 58 ▲    58 = |
| Evolution of the distance | 58 ▲   58 =   58 ▼ |

FIG.17

ANTI-COLLISION DEVICE AND RELATED AVIONIC PROTECTION SYSTEM, ANTI-COLLISION METHOD AND COMPUTER PROGRAM

CROSS-REFERENCE TO RELATED APPLICATIONS

This application claims priority to French Patent Application No. 18 01152, filed Oct. 31, 2018. The disclosure of the priority application is incorporated in s entirety herein by reference.

FIELD OF THE INVENTION

The present invention relates to an anti-collision device of an aircraft comprising a plurality of sensors, the plurality of sensors comprising at least two separate sensors, each sensor being configured to respectively deliver its own set of captured data as a function of the proximity of at least one obstruction.

The invention also relates to an avionics system for protecting an aircraft.

The invention also relates to an anti-collision method and an associated computer program product.

Hereinafter, an obstruction refers to any element configured to hinder the movement of the aircraft, be it on the ground (or land), a natural element of the relief, a man-made structure such as a building, a bridge, a power cable, a temporary element and/or an element configured to move such as a plant or animal element, a human being, a vehicle, etc.

An aircraft refers to any means of transportation configured to rise to a non-nil altitude relative to the ground, such as an airplane, an aircraft, a drone, etc.

The invention relates to the field of assistance in aircraft piloting in particular in order to alert the crew, or at least the pilot, of a collision risk with an element of the overflown area.

BACKGROUND OF THE INVENTION

Due to the types of mission performed (landing and takeoff in hard-to-access and/or unprepared areas, flight at low altitude, hovering very close to the relief (for example, mountain rescue, observation)), an aircraft is a vehicle that is highly exposed to the risk of collision with one or more obstructions located in its immediate environment.

Currently, considering an integrated surveillance system (ISS) of the aircraft in particular comprising a Terrain Awareness & Warning System or Helicopter Terrain Awareness & Warning System (TAWS or HTAWS) that perform, in particular as described in FR 2,773,609, a primary anti-collision surveillance function with the terrain and are intended to emit sound alerts upon a dangerous approach with respect to the relief, allowing the crew to react by engaging an avoidance maneuver before it is too late.

Such systems globally make it possible to protect the aircraft during the cruising phase by basing themselves on predefined digital terrain and obstacle models, but their functions are limited, if not inhibited, during takeoff and landing phases, during which the collision cases are the most frequent.

Furthermore, such systems are not configured to detect obstacles in all directions, especially those that are mobile such as land-based vehicles, or temporary such as vegetation or cranes, for example.

Lastly, the alert generated by such systems is representative only of the excess of a predetermined alert threshold, but is not representative of a relative deviation between the real-time situation of the aircraft and this predefined threshold.

Active, laser-, radar-based detection systems are also known, in particular short-range radar-based systems. However, such systems are complex and expensive to install on an aircraft, sensitive to environmental conditions (e.g., dust, fog), offer partial coverage of the aircraft (that is to say, for example only the front part of the aircraft is protected and not the side parts and the rear empennage), and/or associated with a high number of received echoes that are a source of surrounding noise configured to disrupt the operation of other instruments of the aircraft.

Also known are systems of the enhanced vision type configured to perform a collision protection function by improving the depiction of the real-time situation of the aircraft for the crew; however, such systems have a field of vision with partial coverage in light of the entire aircraft surface to be protected.

SUMMARY OF THE INVENTION

The aim of the invention is then to propose an avionic device and method that make it possible to enhance the security of the entire aircraft (i.e., front, rear, side part, top, bottom) and its occupants irrespective of the flight phase, the type of obstruction, the flight altitude.

To that end, the invention relates to an anti-collision device of an aircraft comprising a plurality of sensors, the plurality of sensors comprising at least two separate sensors, each sensor being configured to respectively deliver its own set of captured data as a function of the proximity of at least one obstruction, the anti-collision device comprising:
at least one data homogenization module configured to transform at least one set of detected data into a corresponding set of unmarked data,
each set of unmarked data respectively associated with at least one sensor being made up of a plurality of identical data types from one set of unmarked data to another,
a data processing module configured to generate, from said sets of unmarked data, at least one piece of information representative of the presence or absence of obstruction(s).

"Separate" means that the sensors are physically separate and therefore associated with separate positions within the aircraft. As an optional addition, some sensors also use different technology.

With the anti-collision device according to the invention, the technical advantages of each sensor are used while doing away with the technology and/or the technological evolution of the sensor used by means of the homogenization module implemented. Such an homogenization module [serves] as interface between the sensors on the one hand, and the functional core of the anti-collision device on the other hand, namely the processing module taking advantage of the plurality of sets of unmarked data obtained in order to increase the relevance and the coverage area of the obstruction detection done, for any type of obstruction.

Such a system is sustainable because it is independent of technological upgrades or the origin of the sensors configured to be added/replaced throughout the use of the aircraft.

According to other advantageous aspects of the invention, the anti-collision device comprises one or more of the following features, considered alone or according to all technically possible combinations:

the plurality of identical data types comprises at least the following three data types, in the presence of a detected obstruction:

at least one datum representative of an obstruction position;

at least one datum representative of the likelihood of obstruction detection;

at least one datum representative of the obstruction size;

the anti-collision device further comprises a completion module configured to complete, from a set of unmarked data associated with one of the sensors, at least one missing value associated with a type, from the plurality of identical data types of a set of unmarked data of another sensor of the plurality of sensors of the aircraft;

the anti-collision device further comprises:

a data preprocessing module at least configured to merge the data from all of the unmarked data sets as a function of a detection zone associated with each sensor and sending them to the data processing module, and/or a supervision module configured to command the plurality of sensors as a function of at least one input parameter belonging to the group comprising at least:

a sensor configuration parameter;

a flight parameter of the aircraft;

a parameter representative of at least one mission of the aircraft;

a parameter representative of a piloting command entered by the pilot;

information representative of the current flight phase of the aircraft;

a parameter representative of the operational piloting mode;

the preprocessing module is further configured to apply temporal filtering to each set of unmarked data eliminating the data associated with an obstruction whose presence duration near the aircraft is below a predetermined threshold;

the preprocessing module is further configured to compare the merging of the data of all of the sets of unmarked data to a history of merged data previously stored;

when at least one of the sensors of the aircraft is configured to determine the relative speed of an obstruction, the data processing module is also configured to generate information representative of the presence or absence of drift of the aircraft during hovering.

The invention also relates to an avionics system for protecting an aircraft comprising a terrain awareness and warning device and an anti-collision device as defined above, the terrain awareness and warning device and the anti-collision device each being configured to be activated/deactivated according to a predetermined degree of activation/deactivation from at least one input datum of the same type.

With the avionics protection system according to the invention, the anti-collision device previously defined completes an existing terrain awareness and warning system (TAWS or HTAWS, Terrain Awareness & Warning System or Helicopter Awareness & Warning System), for example so as to effectively cover all of the flight phases, which makes it possible to offer continuous or nearly continuous protection.

For example, the anti-collision device previously defined is implemented to offer low-speed protection and a device of the TAWS type, as described for example in patent FR 2,773,609, is used to cover the rest of the flight phases of the aircraft.

In other words, in the avionics protection system according to the invention, the terrain awareness and warning system and the anti-collision device according to the invention complete one another and are configured to act cohesively so as to increase the overall safety of the aircraft and the crew, each device offsetting the weaknesses of the other.

According to other advantageous aspects of the invention, the avionics protection system comprises one or more of the following features, considered alone or according to all technically possible combinations:

the terrain awareness and warning system and the anti-collision device are configured to interact;

the avionics protection system comprises a supervision device configured to command the activation/deactivation of the terrain awareness and warning system and the activation/deactivation of the anti-collision device using said input datum of the same type;

the terrain awareness and warning system and the anti-collision device are configured to operate independently of one another using at least one input datum of the same type as an activation/deactivation datum.

The invention also relates to an anti-collision method of an aircraft comprising a plurality of sensors, the plurality of sensors comprising at least two technologically separate sensors, each sensor being configured to respectively deliver its own set of captured data as a function of the proximity of at least one obstruction, the method being implemented by an anti-collision device and comprising at least:

a data homogenization of each set of captured data in a corresponding set of unmarked data, each set of unmarked data respectively associated with each sensor ($C_i$) being made up of a plurality of identical data types from one set of unmarked data to another, a data processing generating, from said sets of unmarked data, at least one piece of information representative of the presence or absence of obstruction(s).

The invention also relates to a computer program including software instructions which, when executed by a computer, implement an anti-collision method as defined above.

BRIEF DESCRIPTION OF THE DRAWINGS

These features and advantages of the invention will appear more clearly upon reading the following description, provided solely as a non-limiting example, and done in reference to the appended drawings, in which:

FIGS. 14 to 17 illustrate different display examples configured to present the information generated by the processing module of the anti-collision device according to the invention;

DETAILED DESCRIPTION OF PREFERRED EMBODIMENTS

In the rest of the description, the expressions "substantially equal to" or "on the order of" refer to an equality relationship to within plus or minus 10%, i.e., with a variation of no more than 10%, also preferably to an equality relationship to within plus or minus 5%, i.e., with a variation of no more than 5%.

Figure 1:
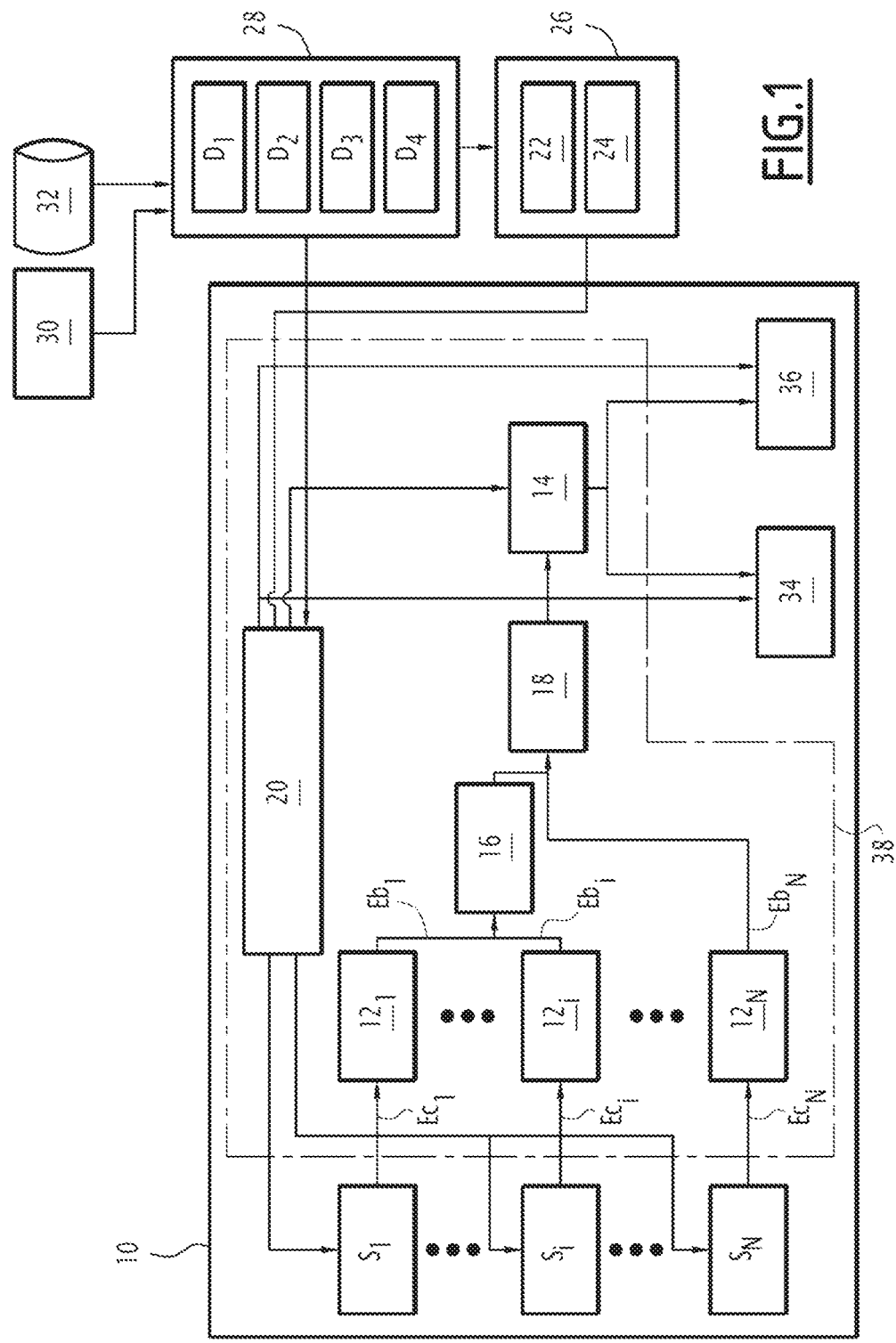
FIG. 1 is a schematic illustration of an anti-collision device according to the invention.

In FIG. 1, an electronic anti-collision device 10, in particular intended to be placed on board an aircraft, comprises, for each sensor $S_1$ to $S_N$, a plurality of N sensors, a data homogenization module 12 configured to transform at least one set of captured data $Ec_i$ into a corresponding set of unmarked data $Eb_i$ respectively associated with each sensor $S_i$ being made up of a plurality of identical data types from one set of unmarked data to another.

Furthermore, the electronic anti-collision device 10 comprises a data processing module 14 configured to generate, from said sets of unmarked data $Eb_1, Eb_2, \ldots Eb_i, \ldots, Eb_N$, at least one piece of information representative of the presence or absence of obstruction(s). Such a data processing module 14 is generic because it is only able to process generic data types obtained from the homogenization module 12. In other words, the processing module 14 is independent of the sensor technologies implemented on the aircraft.

Additionally, as shown in FIG. 1, the electronic anti-collision device 10 also optionally comprises a completion module 16 configured to complete, from a set of unmarked data $Eb_i$ associated with one of the sensors $S_i$, at least one missing value associated with a type, from the plurality of identical data types of a set of unmarked data $Eb_j$ of another sensor $S_j$ of the plurality of sensors $S_1, S_2, \ldots, S_i, \ldots S_N$ of the aircraft.

As illustrated in FIG. 1, according to a variant, the completion module 16 is applicable to only part of the obtained sets of unmarked data (i.e., not to all of the obtained sets of unmarked data (that is to say, not to all of the obtained sets of unmarked data such as, for example, the set of unmarked data $Eb_N$ supplied by the homogenization module $12_N$ applied to the sensor $S_N$) and according to another variant, the completion module 16 is applicable to all of the obtained sets of unmarked data.

The electronic anti-collision device 10 also optionally comprises a data preprocessing module 18 at least configured to merge the data from all of the unmarked data sets $Eb_1, Eb_2, \ldots, Eb_i, \ldots Eb_N$ as a function of a detection zone associated with each sensor $S_1, S_2, \ldots, S_i, \ldots S_N$ and sending them to the data processing module 14, and/or optionally comprises a supervision module 20 configured to command the plurality of N sensors $S_1, S_2, \ldots, S_i, \ldots S_N$ as a function of at least one input parameter belonging to the group comprising at least:

a sensor configuration parameter $D_1$;

a flight parameter $D_2$ of the aircraft;

a parameter $D_3$ representative of at least one mission of the aircraft;

a parameter $D_4$ representative of a piloting command entered by the pilot;

information 22 representative of the current flight phase of the aircraft;

a parameter 24 representative of the operational piloting mode.

Configuration parameter $D_1$ in particular refers to the number N of sensors, the position of the sensors on the aircraft, the field of vision of the sensors (angular coverage, minimum and maximum detection range), the technology of the sensors (optical, radar, camera, etc.), the dimensions of the aircraft (length, width, size of the rotors), the operating ranges of the sensors (speed and height), the margins for triggering information of the awareness type (in particular corresponding to the obstruction distance), the margins for alert signaling, the flight phases/usage operating mode of the various sensors (depending on the technology on the location) containing the inhibition and maximum transmission power information of each sensor, the thresholds and confirmation times for the flight phase changes, the different sounds able to be produced to inform the crew, and depending on the architectures, the priorities between the alerts produced by the anti-collision device 10 and those supplied by a surveillance device other than a TAWS.

Flight parameter of the aircraft $D_2$ refers at least to the data triplet comprising the height (that is to say the altitude), the speed vector and the attitude (pitch, roll, yaw) of the aircraft, and optionally one or more pieces of information representative of: the flight phase, the variation of the speed vector, the location of the aircraft, geographical areas with restricted or prohibited use for the sensors, TAWS alert areas and types: supplying the terrain or obstruction alert type in progress delivered by a device of the TAWS/ISS type, these alerts being based on a comparison between the anticipated trajectory of the aircraft and a digital terrain model and not on an acquisition of the actual environment of the aircraft.

A parameter representative of at least one mission of the aircraft $D_3$ refers to the data supplied by the mission database 32 containing the usage exclusion zones of the various sensors (depending on the technology).

A parameter representative of a piloting command entered by the pilot $D_4$ refers to pilot commands of the total start/stop type per sensor and optionally the commands associated with the functional modes (a "hover" type) and a "winching" mode for example, for total or temporary inhibition of modulation of the power thresholds for emissions of the sensor, etc.

The information representative of the current flight phase 22 of the aircraft and the parameter representative of the operational piloting mode 24 are for example provided as illustrated by FIG. 1 by a piloting mode management module 26.

The input parameters $D_1$ to $D_4$ are generated by a module 28 for managing input parameters in particular supplied by a piloting command entry interface 30 (or MMI, Man-Machine Interface) and by a database 32 concentrating data associated with a plurality of potential mission(s) of the aircraft.

In the case of an aircraft corresponding to a drone, the input parameters $D_1$ to $D_4$ entered by a pilot are transmitted via a data link, not shown, between a ground station and the aircraft.

Furthermore, according to the example of FIG. 1, the electronic anti-collision device also comprises a display module 34 and/or a sound retrieval module 36 configured to retrieve, for at least one crewmember or the pilot, the information representing the presence or absence of obstruction(s) determined by the data processing module 14.

Such a display module 34 for example incorporates a head-down or head-up (or head-worn) display or is connected to a screen offloaded in an electronic flight bag (EFB) or such as an additional tablet.

The piloting mode management module 26 is configured to calculate the different operational modes from entries made by the crew into the interface 30 and flight parameters $D_2$ of the aircraft. The switch from one mode to the other is either direct, for example, by manual selection by the pilot of the cover mode, or forced automatically by the piloting mode management module 26 based on a combination of flight parameters $D_2$; for example, in case of stable position at a certain ground height, the stationary mode is activated automatically.

The different modes and their selection criteria are integrated into the configuration parameters $D_1$ and in particular comprise flight modes such as "low level flight", "hover", "winching", "search and rescue", "tactical flight" or modes for sending piloting assistance information acting on the delivered outputs such as an "exclusive display mode" inhibiting the sound retrieval module outputs 36, the "alert" mode only producing information of the alert type, and the "Awareness" mode, which will only produce warnings and not alerts, as well as the "inhibit/temporarily inhibit" mode configured to inhibit information generation during a limited time period.

According to a variant corresponding to the assembly 38, the sensors $S_1, S_2, \ldots, S_i, \ldots S_N$ and/or the display module 34 and/or the sound retrieval module 36 are not integrated within the anti-collision device 10 but outside the latter, and are connected to the linking means, which may or may not be wired, to this anti-collision device 10.

In other words, according to this variant, the sensors $S_1, S_2, \ldots, S_i, \ldots S_N$ and/or the display module 34 and/or the sound retrieval module 36 are for example incorporated within the aircraft and used by other devices, for example for complementary piloting assistance functions.

According to another variant, in particular when the aircraft is a drone devoid of human pilot in its passenger compartment, the display module 34 and/or the sound retrieval module 36 located within a ground control platform and the information representative of the presence or absence of obstruction(s) determined by the data processing module 14 is communicated via a transceiver module (not shown) of the drone, such a transceiver module being configured to be incorporated within the anti-collision device 10 according to one aspect or outside the anti-collision device 10.

In the example of FIG. 1, the anti-collision device 10, 38 comprises an information processing unit, not shown, for example made up of a memory and a processor associated with the memory.

In the example of FIG. 1, the homogenization module 12, the processing module 14, the completion module 16, the preprocessing module 18 and the supervision module 20 are each made in the form of software, or software brick, executable by the processor. Each of these modules 12, 14, 16, 18, 20 is configured to implement, automatically (that is to say, without human intervention), dedicated processing operations described hereinafter.

The memory of the electronic anti-collision device 10 is then configured to store data homogenization software configured to transform at least one set of captured data $Ec_i$ into a corresponding set of unmarked data $Eb_i$, each set of unmarked data $Eb_i$ respectively associated with each sensor $S_i$ being formed by a plurality of data types that are identical from one set of unmarked data to another, data processing software configured to generate, from said sets of unmarked data $Eb_1, Eb_2, \ldots, Eb_i, \ldots Eb_N$, at least one piece of information representative of the presence or absence of obstruction(s), completion software configured to complete, from a set of unmarked data $Eb_i$ associated with one of the sensors $S_i$, at least one missing value associated with a type, from the plurality of identical data types of a set of unmarked data types $Eb_j$ of another sensor $S_j$ of the plurality of sensors $S_1, S_2, \ldots, S_i, \ldots S_N$ of the aircraft, preprocessing software configured to merge the data of all of the sets of unmarked data $Eb_1, Eb_2, \ldots, Eb_i, \ldots Eb_N$ as a function of a detection area associated with each sensor $S_1, S_2, \ldots, S_i, \ldots S_N$ and sending them to the data processing software module 14, and supervision software configured to command the plurality of sensors $S_1, S_2, \ldots, S_i, \ldots S_N$ as a function of at least one input parameter belonging to the group comprising at least one sensor configuration parameter, a flight parameter of the aircraft, information representative of the current flight phase of the aircraft, a parameter representative of the operational piloting mode, a parameter representative of at least one mission of the aircraft.

The processor is then configured to execute each of the software applications from among the homogenization software, the processing software, the completion software, the preprocessing software and the supervision software.

In a variant that is not shown, the homogenization module 12, the processing module 14, the completion module 16, the preprocessing module 18 and the supervision module 20 are each made in the form of a programmable logic component, such as an FPGA (Field Programmable Gate Array), or in the form of a dedicated integrated circuit, such as an ASIC (Application Specific Integrated Circuit).

When the anti-collision device 10 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The plurality of sensors $S_1, S_2, \ldots, S_i, \ldots S_N$ for example comprises sensors positioned below the aircraft, in particular when it involves a helicopter, the bottom of which is an exposed part, and/or sensors installed on the fuselage sides, since the lateral axes are also exposed to the obstructions, and/or sensors installed on the tail of the aircraft in particular corresponding to one of the most exposed parts of the aircraft and which is not visible to the crew, such sensors allowing the simultaneous detection of obstructions at the lateral axis, the vertical axis and the rear axis of the aircraft.

The set of N sensors $S_1, S_2, \ldots, S_i, \ldots S_N$ is able to comprise sensors with identical technologies, for example radars in distinct positions or sensors with distinct technologies and/or distinct manufacturers making it possible to mix radars, electro-optical sensors such as cameras, infrared sensors or sensors in the visible domain, lidars, a 3D flash laser, or ultrasound sensors.

The number and types of active sensors installed on the aircraft define the number of axes considered for the protection and the associated coverage area.

Advantageously, the overlap between the detection areas of one or several sensors is implemented to perform the correlation during a data grouping in order to reduce the false detection (nuisance) rate.

Depending on the targeted applications of the anti-collision device 10, such an overlap results directly and naturally from the field of vision of the sensors and the number of sensors necessary to cover the desired protection zone, or is optimized to minimize the nuisance in certain zones (for example in front of the aircraft).

Systematic sensor installation positions are for example used in order to accelerate the aircraft certification. For example, for a fixed-wing aircraft, the sensors are installed at the end of the wing and below the nose of the aircraft, with the possibility of being co-located with lighting elements of the fixed-wing aircraft.

For a rotary-wing aircraft, the sensors are for example installed on the body of the aircraft or below the nose thereof as a last resort (in order to limit the aerodynamic drag). Preferably, the sensors are installed on the skids of the aircraft if the latter has any. Such an installation configuration of the sensors makes it possible to limit the impact on a rotary wing aircraft structure and also simplifies the passage of cables necessary to supply power to the sensors.

For a fixed-wing aircraft, as well as a rotary-wing aircraft, an installation below the aircraft of a sensor, corresponding to an assembly making it possible to combine two cameras in order to film in 3D relief (camera rig), is also for example implemented.

Certain sensors purchased from a COTS (Commercial Off-The-Shelf) supplier, used in particular for their moderate cost, such as automobile radars whereof the reception antennas of the radars are arranged longitudinally, do not make it possible to escalate data of the azimuth, distance type, except in a plane, for example horizontal.

To resolve this, a combination of two identical sensors, for example two radars, arranged such that their respective field of vision is offset by 90° relative to one another, is implemented, thus forming a first type of virtual "macro-sensor" whereof the actual field of vision corresponds to the intersection of the two fields of vision of the two sensors forming it.

A first radar of this macro-sensor detects the potential obstructions and provides their horizontal azimuth, the distance between the obstruction and the aircraft, the estimated size as well as the associated speed vector. The second radar of this macro-sensor also detects the same obstructions, provides their vertical azimuth, the distance between the obstruction and the aircraft, the estimated size as well as the associated speed vector.

Figure 2:
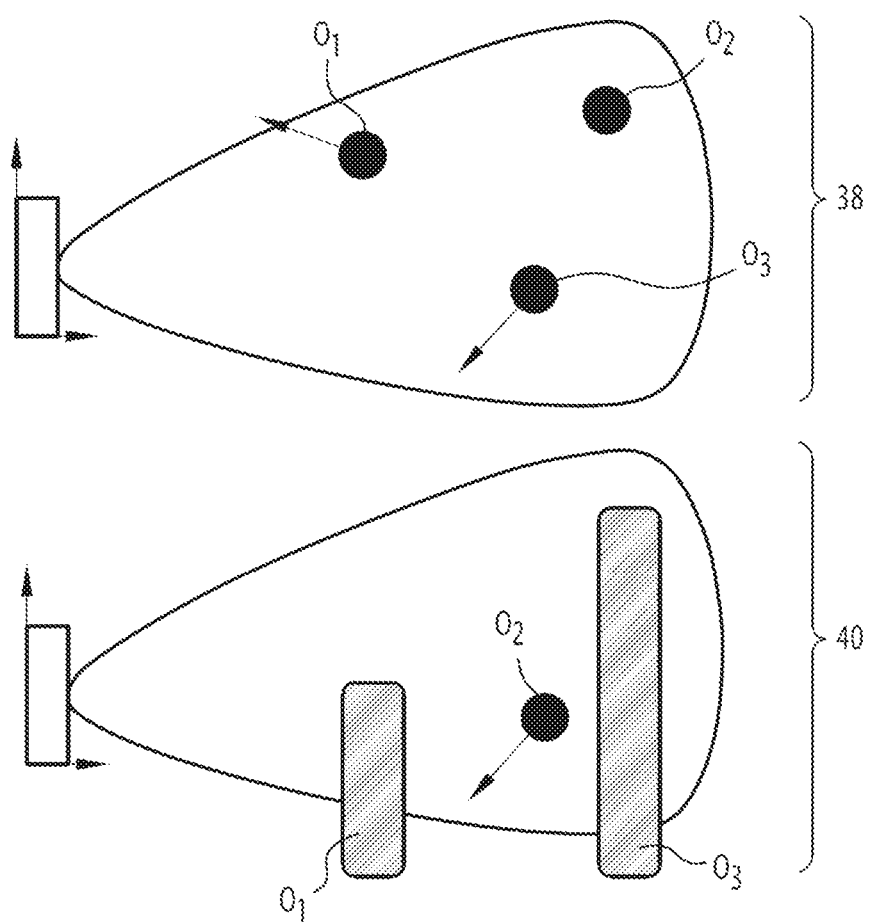
FIG. 2 schematically illustrates the shared obstruction vision seen by two separate sensors, one of them being oriented at 90° relative to the other.

FIG. 2 schematically illustrates the shared vision of obstructions $O_1$, $O_2$, $O_3$ seen by these two distinct radars, in the horizontal plane 38 delivered for example by the first radar, and in the vertical plane 40 delivered for example by the second radar oriented at 90° relative to the first radar.

The obstruction parameters delivered by each of the radars forming the macro-sensor are prioritized to associate the same obstruction, for example $O_1$, both in the horizontal plane 38 and in the vertical plane 40. For example, the value of the absolute obstruction speed delivered by the two radars is first used, then the obstruction distance to the aircraft, then the size (the size being a lower priority and being able to differ for a same obstruction between the size seen in the horizontal plane 38 and that seen in the vertical plane 40).

In other words, two obstructions respectively detected by each of the radars and first having a similar relative longitudinal speed vector in direction (that is to say, representative of an approach, a separation, a stationary position) and in norm are considered to be able to potentially be associated with a same obstruction, which is next confirmed when the aircraft-obstruction distance is identical or practically identical and optionally reconfirmed by the detected size. Indeed, two obstructions having the same movement speed, located at the same distance and having the same size have a likelihood of being identical greater than 90%.

The second radar configured to deliver information in the vertical plane 40 intervenes to complete the information from the first radar (and not the reverse) since, according to one particular aspect of the invention, the information on the horizontal location of the obstruction is deemed more important than the height information.

Such a first macro-sensor solution based on two radars whose orientation is offset by 90° relative to one another is configured to contribute height information at a lower cost.

The information being brought back into a plane, two fixed obstructions with different heights and located at equal distances from the aircraft are configured to be temporarily perceived by such a macro-sensor, erroneously, as both having the same height (that is to say, the higher one), but due to the flight dynamics of the aircraft, the equal distance in both planes 38 and 40 cannot be maintained indefinitely, such that without such maintenance, the two obstructions can be seen with their actual respective heights.

To offset such an erroneous temporary perception of the first type of macro-sensor based on the use of two radars, another arrangement of sensor(s) can be implemented according to the invention as a variant, and is based on a second type of virtual macro-sensor formed by at least three COTS sensors arranged offset at least vertically and configured to applying a triangulation illustrated by FIGS. 3 and 4 described hereinafter. Each sensor of the second macro-sensor type is configured to acquire the impulses emitted by the other sensors while identifying their origin distinctly. Furthermore, the different sensors share the same temporal reference and operate over the same frequency ranges.

In general, the homogenization module 12 is configured to process a signal supplied by one of the sensors by equalizing this signal so as next to supply the processing module 14 with uniform data independent of the sensor technology used.

According to one specific aspect, the homogenization module 12 is also configured to consolidate the information acquired by each sensor (or macro-sensor) so as to eliminate the surrounding noise (for example false radar echoes, light pollution, etc.) inherent to the technology of the sensor used. Optionally, the homogenization module 12 also provides obstruction monitoring.

In other words, the homogenization module 12 serves as interface between a sensor or a macro-sensor and the processing module 14 so as to present it with data of the same nature irrespective of the sensor technology used or its manufacturing origin.

According to a first variant as illustrated in FIG. 1, the anti-collision device 10 (or 38) comprises as many homogenization modules 12 as there are sensors, namely the integer N.

According to one particular aspect of this first variant, the homogenization module 12 is also responsible for performing a first filtering of the data delivered (that is to say, detected) by the sensor with which it is associated such that each homogenization module 12 provides, as output, a set of M unmarked data of the same nature.

Such an homogenization module 12 is specific to the sensor technology and manufacturer(s) with which it is associated, since it is configured to analyze the data supplied by such a sensor to convert it into data of the same type from one sensor to another.

In other words, an homogenization module $12_i$ associated with a sensor $S_i$ corresponding to a radar and an homogenization module $12_j$ associated with a sensor $S_j$ corresponding to an ultrasonic sensor is configured to deliver, in the presence of an obstruction detected by each of the sensors $S_i$ and $S_j$ with which it is associated, a set of data $Eb_i$ and $Eb_j$ of identical types and distinct values respectively associated with each sensor $S_i$ and $S_j$. The processing implemented by the functional core of the anti-collision device 10, namely the processing module 14 receiving such sets of unmarked input data, is then simplified, which allows it to do away with any dependency on the nature or the origin of the sensor used and to concentrate on the reliable delivery of information representative of the collision risk incurred by any area of the aircraft.

In terms of physical architecture, the homogenization module $12_i$ is located as close as possible to the sensor $S_i$ with which it is associated, or even integrated therein (not shown).

In particular, the plurality of identical data types comprises at least the following three functional data types, in the presence of a detected obstruction:
- at least one datum representative of an obstruction position;
- at least one datum representative of the likelihood of obstruction detection;
- at least one datum representative of the obstruction size (e.g., small size category if it has a dimension below a first predetermined size threshold, medium size category if it has a dimension between said first predetermined size threshold and a second predetermined size threshold, large size category if it has a dimension larger than the second predetermined size threshold, or the dimensions of the obstruction directly if the technology of the associated sensor allows it).

Optionally, in particular to provide obstruction monitoring, these three types of data are completed by the following additional functional data types:
- an identifier of the obstruction;
- a datum representative of the speed vector of the detected obstruction(s). Here, reference is made to the absolute speed vector, independent of the movement of the aircraft (direction in 2D or 3D and standardized value);
- a datum representative of the variation of the speed vector of the detected obstruction(s) (reduction/increase/no change, etc.);
- a datum representative of the variation of the distance between obstruction(s) and the aircraft (for example no change, increase/reduction of the distance), which generally corresponds to the relative speed vector (taking the movement of the aircraft into account);
- a datum representative of the height (that is to say, the elevation) of the obstruction (when the technology of the associated sensor allows it, the height referring to the relative height of the aircraft);
- a datum representative of the relative bearing corresponding to the angle between the direction of the obstruction and the longitudinal axis of the aircraft;
- a datum representative of the speed vector of the aircraft (the datum comprising the 2D or 3D direction and the norm of the vector if the technology of the associated sensor allows it);
- a datum representative of the variation of the speed vector of the aircraft (if the technology of the associated sensor allows it).

Furthermore, optionally, for each of the concerned representative data, a percentage of uncertainty is optionally associated with the value measured by the considered sensor.

According to a second variant, not shown, implementing one or several virtual macro-sensor(s) based on the combination of two COTS sensors or three COTS sensors, the homogenization module 12 associated with each macro-sensor has a distributed architecture, not shown, comprising, on the one hand, for each sensor of the macro-sensor, a first element (or software add-on) configured to perform the receipt, acquisition and processing of the signal transmitted by the sensors making up the virtual macro-sensor, such a first element being specific to the considered type of sensor.

Furthermore, the homogenization module 12, according to this second variant, comprises a second element (or software add-on) configured to process the data delivered by the first element associated with each sensor of the macro-sensor in order to produce as output, per macro-sensor, a complete three-dimensional (3D) unmarked (that is to say, generic) functional datum.

Figure 3:
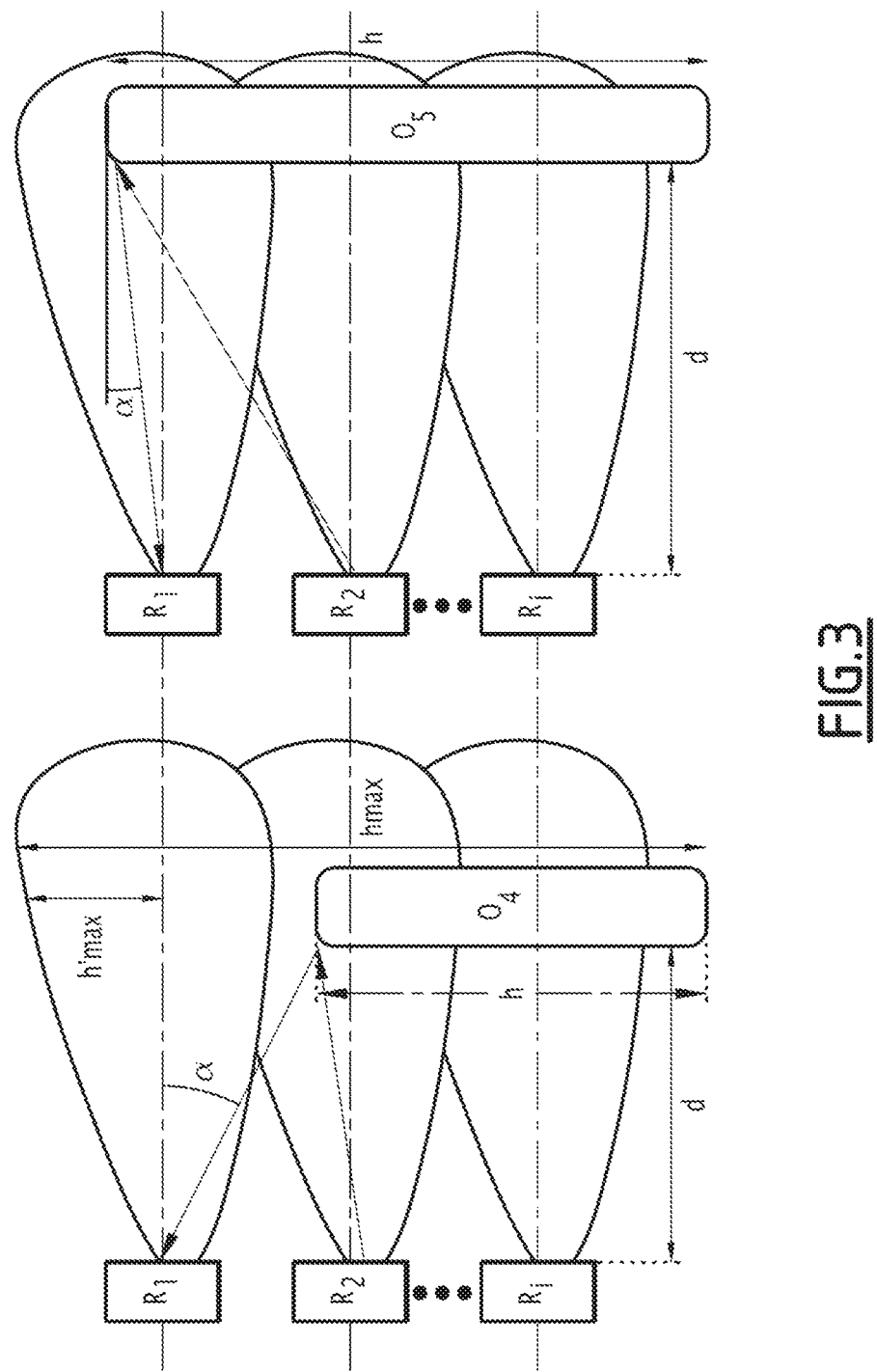
FIGS. 3 and 4 illustrate the triangulation principle applied using three sensors arranged in an offset manner.

For example, for a macro-sensor formed by at least three sensors $R_1, R_2, R_3$, the resolution being directly linked to the number of sensors, as illustrated by FIG. 3, to provide the datum representative of the height h of an obstruction $O_1$, $O_2$, the homogenization module 12 is configured to base itself on a quadruplet of data comprising, for example, the position of the sensors $R_1$ to $R_i$, the identification of the sensor(s) that detected the obstruction solely from their transmissions and/or the set of transmissions, the distance at which the obstruction is seen.

Figure 4:
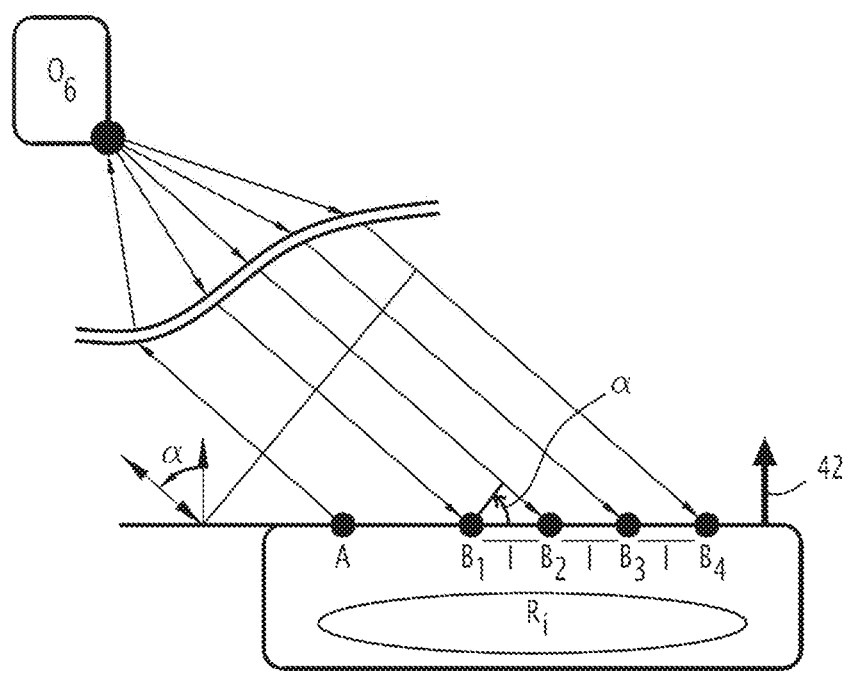

By combining these data with the flight parameters of the aircraft such as the height (that is to say, the flight altitude) of the aircraft, the homogenization module 12 is configured to determine, by geometry, the approximate height at which the obstruction $O_4$ or $O_3$, or $O_6$ is located as illustrated by FIGS. 3 and 4, respectively illustrating the well-known principle of triangulation and azimuth determination in the plane.

In particular, in FIG. 4, a radar comprises a transmitting antenna A and four receiving antennas $B_1$ to $B_4$ each spaced apart by a distance l. The angle $\alpha$ corresponding to the angle between the normal 42 to the sensor $R_i$ and the transmission reflected by the apex of the obstruction $O_6$ is such that $\alpha = \arcsin(p/l)$ with $p = (\varphi_{B1} - \varphi_{B2})\lambda/2\pi$ where $\varphi_{B1}, \varphi_{B2}$, are the horizontal azimuth angles of each receiving antenna and $\Delta$ is the wavelength.

The height of the obstruction is therefore determined by:

$$h = h\max - \sum_j h'\max - \tan(\text{alpha}) * d$$

where hmax is a function of h'max corresponding to the field of vision height and the (radio altitude) height of the aircraft, $\Sigma_j$h'max corresponds to the total height of the half-zones not intersected by the obstruction (if there is one), d corresponds to the distance at which the obstruction is perceived.

According to this second variant based on the use of a micro-sensor, the optional completion module 16 configured to complete the set of unmarked data of a sensor with that of another sensor is not implemented with a view to the use of the second element of the homogenization module 12.

The data preprocessing module 18 is at least configured to merge the data from all of the unmarked data sets $Eb_1$, $Eb_2, \ldots, Eb_i, \ldots Eb_N$ as a function of a detection zone associated with each sensor $S_1, S_2, \ldots, S_i, \ldots S_N$ and sending them to the data processing module 14 and sending them to the data processing module 14 is implemented to address more or less complete protection of the periphery of the carrier.

More specifically, such a preprocessing module 18 is first configured to add a level of temporal filtering to the output of the homogenization module 12 or to the output of the optional completion module 16, in order to eliminate the obstructions present during a duration shorter than a predefined duration, the value of such a predefined duration being able to vary as a function of the absolute speed of the aircraft.

Furthermore, the preprocessing module 18 is further configured to compare the merging of the data of all of the sets of unmarked data $Eb_1, Eb_2, \ldots, Eb_i, \ldots Eb_N$ to a history of merged data previously stored within the memory of the anti-collision device 10.

For merging of the data from all of the sets of unmarked data at a moment t, the preprocessing module 18 is able to successively implement: the sorting of the obstructions of this current merging, by position of each obstruction, then the assignment of an obstruction identifier, then the merging of the obstructions detected by the various sensors, the concatenation of the obstructions whose detection zones are adjacent without overlapping, and the merging of obstructions as a function of their position, their size and their speed when the detection zones overlap; two obstructions of similar sizes located in a neighboring zone and with a similar speed vector (heading and norm), being considered identical as previously described.

A configurable allowance is applied on each merge parameter (uncertainty on the detection zone, allowance on the size (a difference size category, for example) and on the speed vector (+/−10° in direction and +/−15 kts in value, for example).

According to one specific aspect, if, during the merge processing able to be implemented by the preprocessing module 18, an obstruction with no identifier is considered to be comparable to an obstruction already having an identifier, the existing identifier with the lowest value is retained. If the two obstructions are not considered to be identical, they each retain their identifier.

According to one particular aspect, when the preprocessing module 18 does not have the given speed (due to the sensor technology), a greater allowance can be applied on the position of the obstructions. Thus, if an obstruction is detected by a single sensor from the plurality of sensors $S_1$, $S_2, \ldots, S_i, \ldots S_N$, the obstruction thus detected is able to be taken into account by the preprocessing module 18 as a function of an associated uncertainty corresponding to a presence likelihood, in the case at hand if the presence likelihood is below a predetermined likelihood threshold, the obstruction is able to be eliminated.

Each merge associated with its obtainment moment is kept so as to form a history usable by the preprocessing module 18.

According to one particular aspect, the depth of the history is determined so as to cover at least three acquisitions by the slowest sensor. More specifically, if one sensor performs an acquisition every 500 ms and another sensor performs an acquisition every 50 ms, then the history will have a minimum depth of 3*500 ms=1.5 s.

Figure 5:
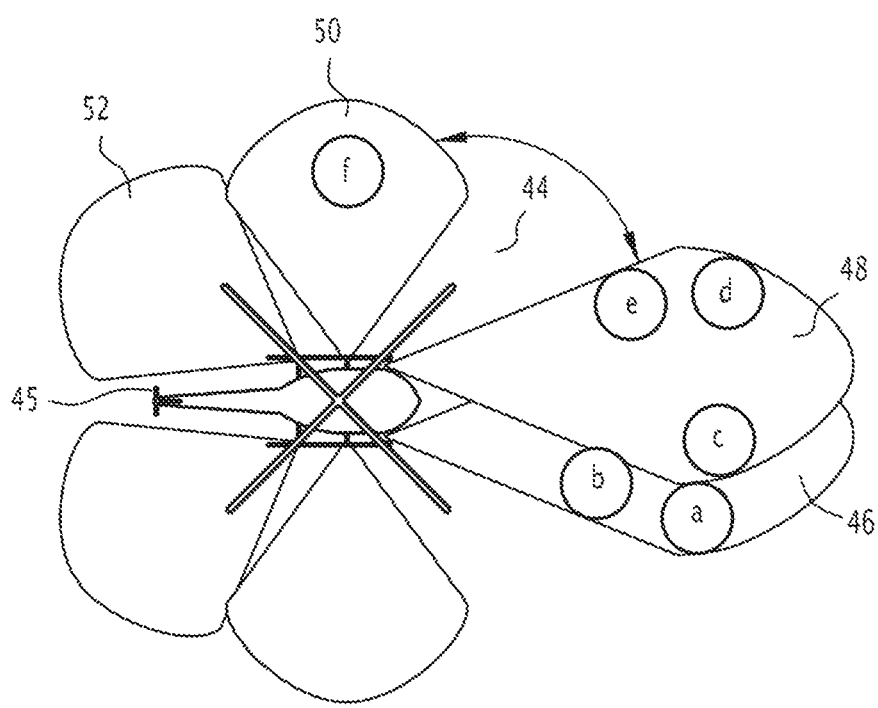
FIGS. 5 to 7 illustrate three successive time samples of preprocessing by merging sets of unmarked data provided by separate sensors.

This history depth is also able to account for the coverage of the largest blank area 44 illustrated in FIG. 5 in the case of a rotary-wing aircraft. To determine this, the angular opening of the blank area will be taken, which will be divided by a minimum average rotation evolution speed of the aircraft. For example, if the blank area measures 20° and a minimum rotation speed of 18°/s is considered, a history depth of 1.7 seconds is applied, since it is greater than the minimum depth of 1.5 seconds previously defined.

Furthermore, the pitch of the history for example corresponds to the frequency of the fastest sensor.

Upon each merge, the preprocessing module 18 is able to compare the result of the current merge to that of the different elements of the history. During this comparison, the period between two merge samples is, according to the invention, below a predetermined temporal value, allowing the application of the hypothesis according to which the speed vector of the obstruction is practically constant. According to this hypothesis, the preprocessing module 18 is then configured to implement obstruction monitoring from the history by projecting an obstruction from the history into the most recent merge.

Such a projection, configured to be implemented by the preprocessing module 18, for each sample from the history, comprises:
  moving the obstruction along its speed vector by a duration equal to the period between two considered merges of the history, the aircraft being considered to be static, then
  correcting the point of arrival of the movement of the obstruction by taking account of the movement of the aircraft between two merges (for example for a rotary-wing aircraft, any rotation along three axes (pitch, roll, yaw) and/or a translational movement), these movement data of the aircraft either coming from the sensors $S_1, S_2, \ldots, S_i, \ldots S_N$ (depending on the technology used), or being provided by an external module (not shown and of the inertial unit type, for example), which may or may not be incorporated into the anti-collision device 10 according to the invention, and lastly
  analyzing the obstructions thus obtained by comparison with the obstructions of the current merge using the same principles as those of the merge, namely that two obstructions of similar sizes located in an adjacent zone and with a similar speed vector are considered to be identical, and that a configurable allowance is applicable to each merge parameter (uncertainty on the detection zone, allowance on the size (a difference category, for example) and on the speed vector (+/−10° in direction (i.e., heading) and +/−15 kts in value, for example). During this step, a unique identifier is assigned to each obstruction. If an obstruction from the history is considered to be comparable to an obstruction from the current merge, the identifier from the history is kept for the obstruction from the current merge. Otherwise, only the obstruction from the current merge is kept with all of its characteristics, including its identifier.

During this comparison operation, the preprocessing module 18 is configured to deduce a variation in the distance between the obstruction and the aircraft (comparison of the relative position of the obstruction to that of the aircraft).

The preprocessing module 18 therefore provides a synthetic vision of the environment of the aircraft as well as the obstructions identified and monitored over time with their characteristics, namely: identifier of the obstruction, sensor(s) having detected the obstruction, position of the obstruction, size of the obstruction, likelihood of existence, elevation (depending on the type of sensor), speed vector of the obstruction (depending on the type of sensor or derived from the measurement of the movement of the obstruction between two samples) and variation of the distance between the obstruction and the aircraft.

Figure 6:
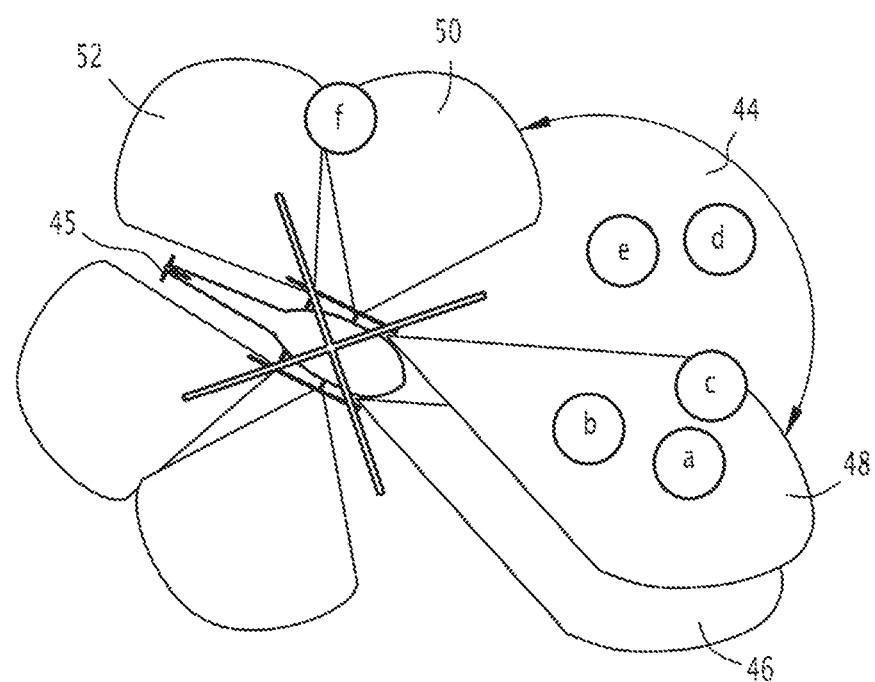
Figure 7:
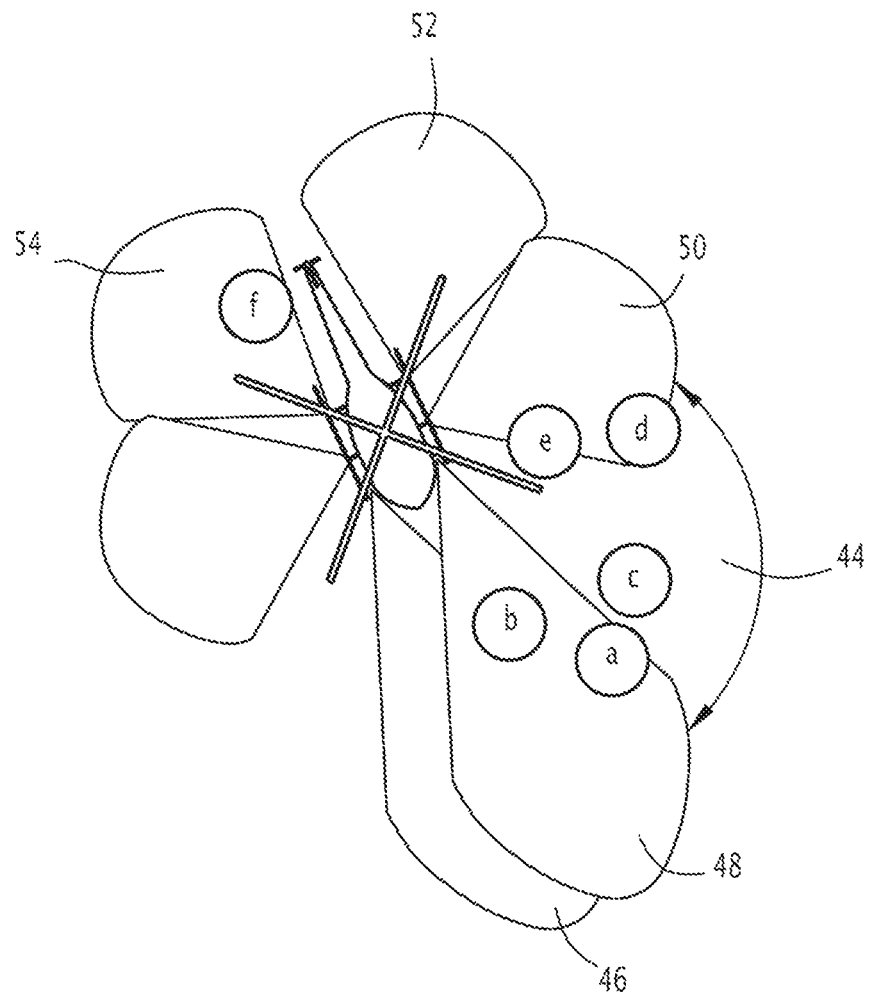

FIGS. 5 to 7 illustrate three distinct and successive samples of such a history. In these three figures, six distinct obstructions a, b, c, d, e, f are shown as well as the coverage areas respectively associated with six sensors installed on the aircraft 45. FIG. 5 shows the oldest sample, FIG. 6 shows an intermediate sample, and FIG. 7 shows the last sample of the three illustrated successive samples.

In FIG. 5 corresponding to an implementation moment $T_0$ of the preprocessing by the preprocessing module 18, the sensor associated with the coverage area 46 detects three obstructions a, b, c, the sensor associated with the coverage area 48 detects three obstructions c, d, e, and the sensor associated with the coverage area 50 detects one obstruction f. The merge preprocessing associated with this moment $T_0$ results in the identification of the six obstructions a, b, c, d, e, f that initialize the obstruction monitoring.

In FIG. 6 corresponding to the moment $T_1$ following the implementation of the preprocessing by the preprocessing module 18, the aircraft 45 has moved, in particular by rotation around the yaw axis, the sensor associated with the coverage area 46 now only detects two obstructions a, b, the sensor associated with the coverage area 48 detects three obstructions a, b, c, the sensors respectively associated with the coverage areas 50 and 52 detect the same obstruction f. The merge preprocessing associated with this moment $T_1$ results in the identification of four obstructions a, b, c and f, the obstructions e, f, not being detected at this moment $T_1$ because they are present in the blank area 44, but the obstruction monitoring overcomes this lack of detection by referring to the sample of the previous moment $T_0$.

In FIG. 7 corresponding to the moment $T_2$ following the implementation of the preprocessing by the preprocessing module 18, the aircraft 45 has moved again, in particular by rotation around the yaw axis, the sensor associated with the coverage area 46 now only detects one obstruction b, the sensor associated with the coverage area 48 detects two obstructions a, b, the sensor associated with the coverage area 50 detects two obstructions e and d, and the sensor associated with the coverage area 54 detects the obstruction f. The merge preprocessing associated with this moment $T_2$ results in the identification of five obstructions a, b, d, e and f, the obstruction c not being detected at this moment $T_2$ because it is present in the blank area 44, but advantageously the obstruction monitoring implemented by the preprocessing module 18 overcomes this lack of detection by referring to the samples from the history obtained at the previous moments $T_0$ and $T_1$.

The data processing module 14 is configured to generate, from said sets of unmarked data $Eb_1, Eb_2, \ldots, Eb_i, \ldots Eb_N$, if applicable completed by the completion module 16, and/or if applicable preprocessed by the preprocessing module 18, at least one piece of information representative of the evaluation of a risk level corresponding to the presence or absence of an obstruction and alert information if applicable.

In other words, the data processing module 14 is in particular configured to determine the dangerousness of the situation and calculating remaining margins between the aircraft and each of the different obstructions located in the near environment of the aircraft, to inform the crew of the presence/absence of an at-risk obstruction and to alert it if necessary.

According to one optional aspect, when at least one of the sensors $S_1, S_2, \ldots, S_i, \ldots S_N$ of the aircraft is configured to determine the relative speed of an obstruction, the data processing module 14 is also configured to generate information representative of the presence or absence of drift of the aircraft during hovering.

In other words, according to this option, the data processing module is configured to inform the crew or at least the pilot of the aircraft of any drift of the rotary-wing aircraft configured to implement a hover phase.

Figure 8:
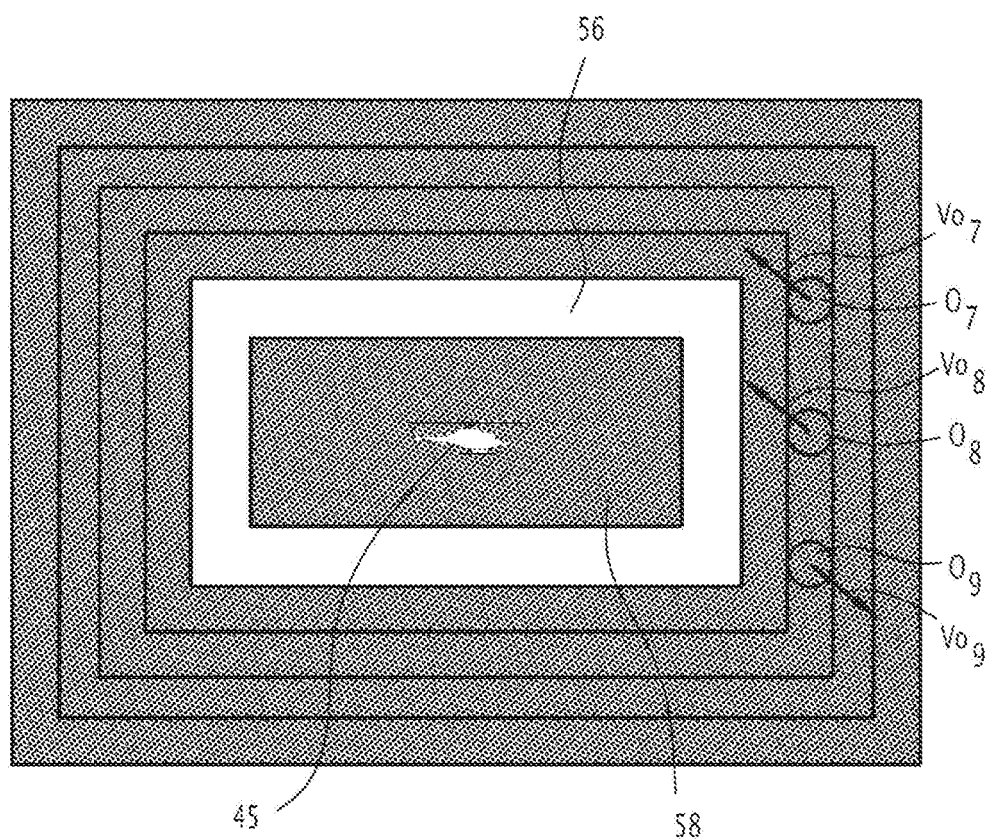
FIGS. 8 and 9 illustrate the principle of thresholds used to alert/inform the pilot.
Figure 9:
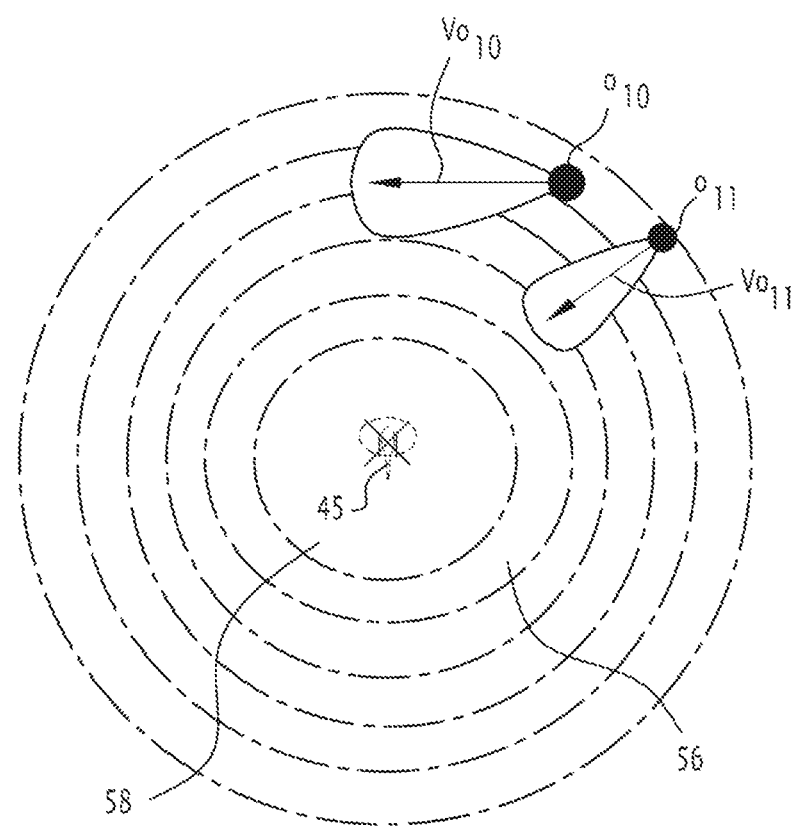

The data processing module 14 is an electronic module configured to automatically (that is to say, without human intervention) implement all of its processing operations while considering the fixed coordinate system of the aircraft (the obstructions are therefore considered in relative position with respect to the aircraft), and the distinction between alert (imminent risk) and warning (that is to say, presence of an obstruction not involving an immediate risk) is made based on a set of predefined time thresholds before impact as illustrated in FIG. 8 or FIG. 9 according to two variants shown concentrically (rectangular and circular, respectively, around the aircraft), where the obstructions $O_7, O_9, O_{10}$ have a speed vector $V_{O7}, V_{O9}, V_{O10}$ revealing that unless there is a trajectory change of the aircraft 45, there is no risk of collision and will only be subject to a warning for the pilot, while the obstructions $O_8$ and $O_{11}$ have a speed vector $V_{O8}, V_{O11}$ oriented towards the location of the aircraft 45 and will be subject to a warning for the crew as long as it stays located in the surveillance area 56 still associated with the warning transmission, and will be subject to an alert for the crew once it is located in the most critical surveillance area 58.

The risk evaluation processing implemented by the data processing 14 is done by comparing the time before impact to predefined time thresholds, these time thresholds optionally being configurable by the pilot for example via an interface of the potentiometer type. Such risk evaluation processing implemented by the data processing 14 seeks to inform the crew or at least the pilot of the presence of an at-risk object in a surveillance area of predefined volume around the aircraft.

The aim sought by the data processing module 14 for this risk evaluation processing is therefore to consider, as most dangerous, the obstructions (including the relief) tending to approach the aircraft the most quickly or toward which the aircraft tends or could tend, and to consider the obstructions moving away from the aircraft or away from which the aircraft is moving quickly enough to be the least dangerous, or inoffensive.

Additionally, according to an optional variant, the data processing module 14 is configured to use, to perform the risk evaluation, an extension of the speed vector of the aircraft 45 and of the obstruction, or a clearance sensor of the TAWS type to determine the at-risk obstructions. A clearance sensor conventionally refers to virtual surfaces calculated by the on-board computer and determining an exploration volume of the space that is compared to the topography of the corresponding terrain as provided by an on-board terrain database. In both cases of this optional variant, the detection principle is similar. The difference is that the clearance sensor consists of defining an area oriented along the speed vector and covering the possible short-term trajectories of the aircraft, such as the obstruction. The length of the area depends on the movement of the aircraft and the predefined anticipation time. In the case where the speed datum of the aircraft is not available, an inclusive length is considered or deduced from the data coming from the sensors (directly, or indirectly by measuring the movement of the aircraft between several data acquisitions).

According to the available aircraft data (attitude (roll angle, incline angle, heading variation, etc.), altitude, vertical speed, ground speed, etc.) and those returned by the sensors, the straight line and curve trajectory cases are distinguished. If this information is not available, only the straight line case is considered.

Figure 10:
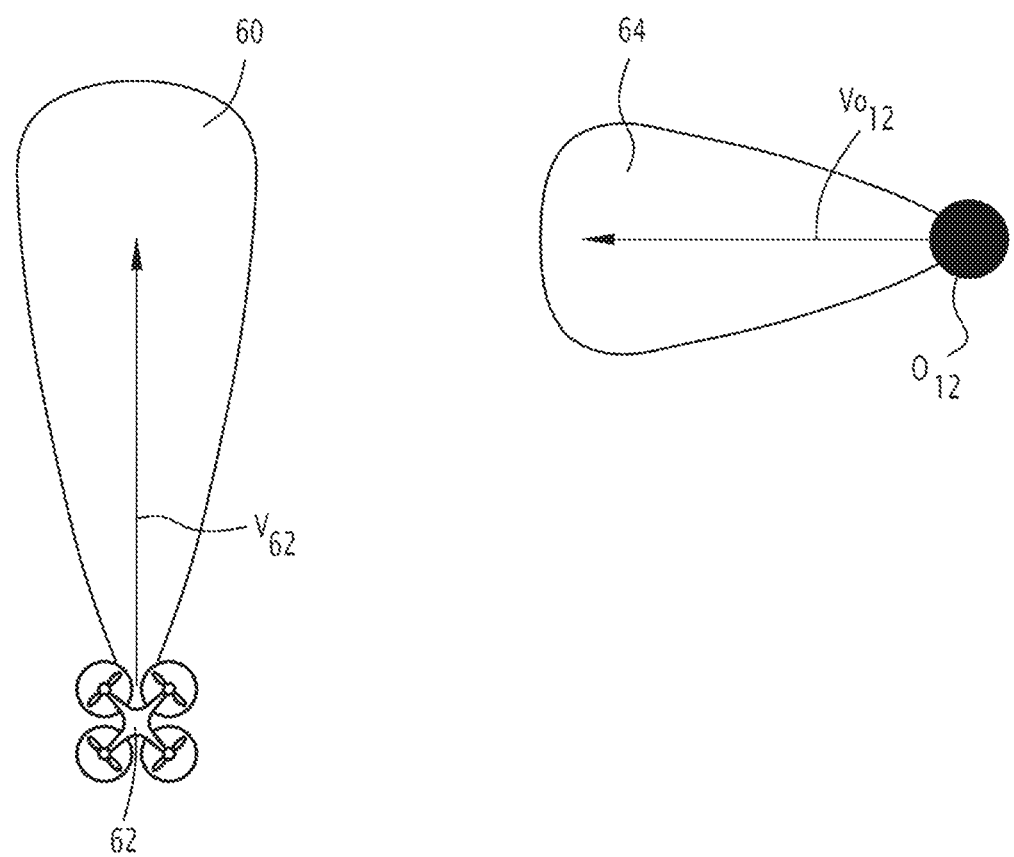
FIGS. 10 to 12 respectively illustrate the movement areas of an aircraft and a movable obstruction in case of movement of the aircraft in a straight line or with a turn, and the associated alert level determination.

In the straight line case, illustrated by FIG. 10, an area 60 is centered on the speed vector $V_{62}$ of the aircraft 62, here a quadcoptor, and another area 64 is centered on the speed vector $V_{O12}$ of the obstruction $O_{12}$, the areas covering the possible movement of the aircraft 60 and the obstruction $O_{12}$ having an opening configurable by several degrees, for example 3°.

Figure 11:
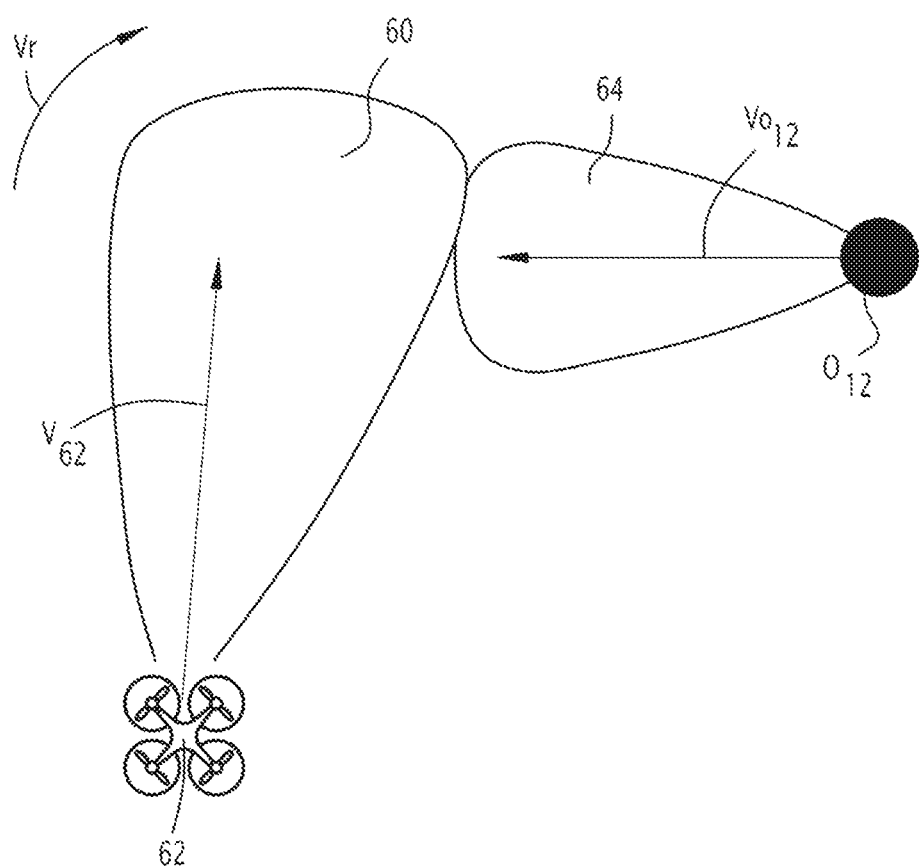

In the turn case $V_r$, illustrated by FIG. 11, the area 60 centered on the speed vector $V_{62}$ of the aircraft 62 is extended in the direction of the turn $V_r$. The angle alpha on the side of the turn is in this case taken to be equal to:

$\beta=(T*g*Tan(A_{roll}))/(2*V)$ in the case of a fixed-wing aircraft, for example. With T, the considered anticipation time (between 0 and 20 seconds, for example), g, the gravitational acceleration, $A_{roll}$ the current roll angle of the aircraft, V, the current ground speed of the aircraft, and $\beta=T*$(actual heading variation+heading variation)/2 in the case of a rotary-wing aircraft 45 or 62, where "actual heading" refers to the heading taking account of the wind, while "heading" refers to the orientation of the nose of the aircraft able to be offset relative to the actual heading in case of crosswind, for example (i.e., quartering flight of the aircraft). It should be noted that depending on the sensor used, the actual heading is sometimes not an accessible datum, in which case its variation is considered nil by default.

The evaluation of the collision risk during a turn $V_r$ is done by comparison to predefined thresholds illustrated by FIGS. 8 and 9 in the pre-impact time determined using the end of the speed/clearance sensor vector of the aircraft and the obstruction.

With each obstruction, the data processing module 14 is thus configured to associate a risk level resulting directly from the closest threshold intersected by one of the following three elements as a function of the selected embodiment variant: the vector representing the distance variation between the obstruction and the aircraft, or the speed vector of the obstruction, or the clearance sensor of the obstruction.

From the risk evaluation processing, the data processing module 14 is configured to implement alert processing to warn the crew or at least the pilot of a collision risk once it is detected that an obstruction has crossed an alert threshold from among the predefined time thresholds described in connection with the risk evaluation processing. Such an alert threshold for example corresponds to the border between the surveillance areas 56 and 58 defined around the aircraft 45 in FIGS. 8 and 9.

According to the optional variant previously indicated for the prior risk evaluation processing, and consisting of applying the extension of the speed vector of the aircraft 45 and the obstruction or a clearance sensor of the TAWS type, an alert is generated once the speed/clearance sensor vector of the aircraft intersects the speed vector of an obstruction, the obstruction in question then being considered to have a proven collision risk. According to this alert processing, the position of the obstruction and the ends of the aircraft are included in the calculation able to be implemented automatically by the processing module 14.

Figure 12:
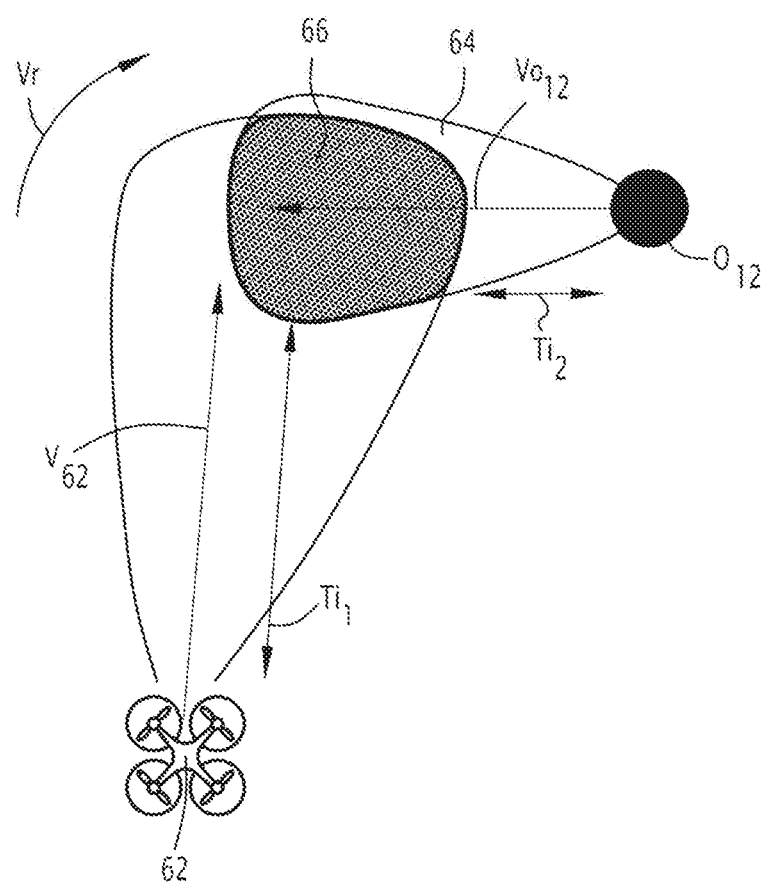

When there is an overlap 66 of the area 60 centered on the speed vector $V_{62}$ of the aircraft 62 and the area 64 is centered on the speed vector $V_{O12}$ of the obstruction $O_{12}$ as illustrated by FIG. 12, a collision risk alert is generated and the identifier of the obstruction $O_{12}$ is stored.

Such alert processing implemented by the processing module 14 is based on the hypothesis according to which, in light of the vertical fields of vision and the range of the various sensors, passing above a detected obstruction, especially if it is movable, does not correspond to a normal operation of the aircraft. The crew (on board or remote in the case of a drone) must therefore be notified in order to analyze the situation.

The alert severity level $N_a$ accounts for predefined alert thresholds (configurable and optionally able to be modulated by the crew) dependent on the total time remaining $T_{tot\_i}=T_{i1}+T_{i2}$ before impact, with $T_{i1}$ and $T_{i2}$ as illustrated in FIG. 12 respectively corresponding to the time separating the overlap area 66 of the clearance sensors of the carrier and the obstruction and the relative speed of the obstruction $O_{12}$, and $N_a=V_{relative\_obstruction}/T_{tot\_i}$.

According to the maximum detection distance offered by the sensors and the level of complexity of the anti-collision device 10 selected by the user (and/or builder), between one and three alert thresholds can be defined according to a decreasing degree of severity, namely a first maximum alert threshold requiring an avoid if, for example, $N_a>4.1$ m·s$^{-2}$, a second alert threshold corresponding to a warning if, for example, $2.5$ m·s$^{-2} \leq N_a \leq 4.1$ m·s$^{-2}$, and a third alert threshold $N_a<2.5$ m·s$^{-2}$ corresponding to a simple caution.

Figure 13:
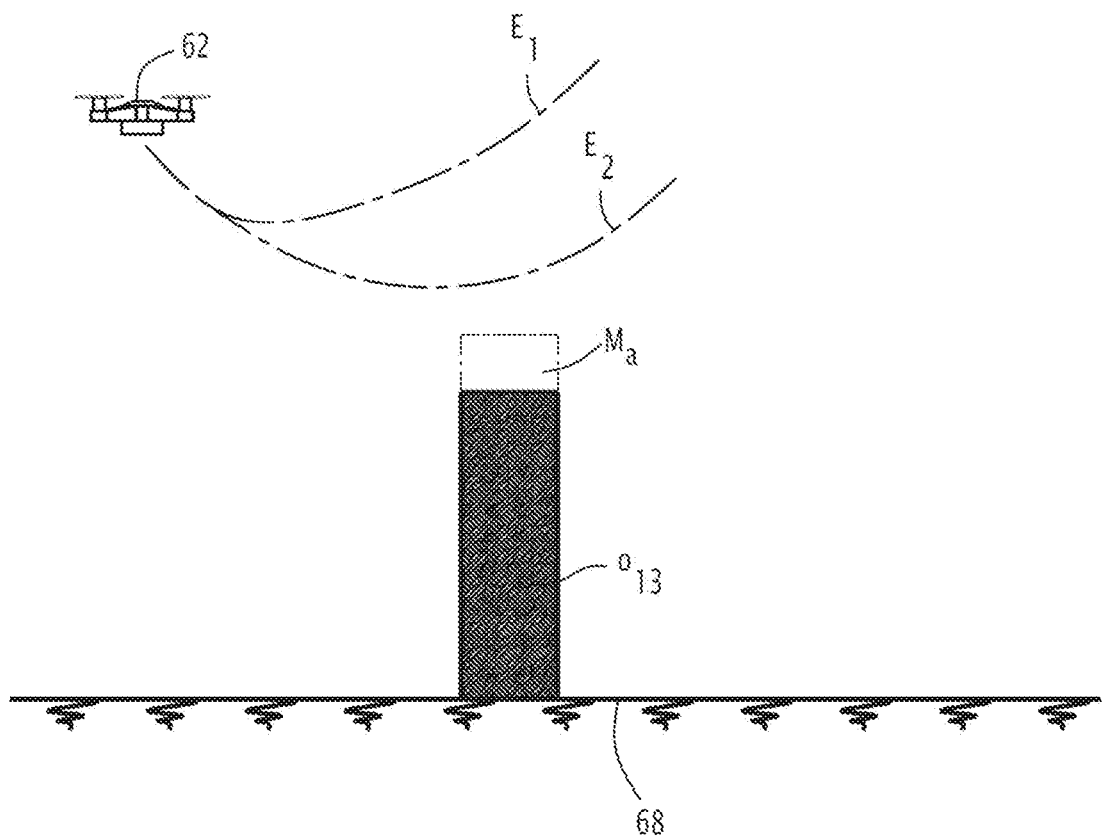
FIG. 13 illustrates a vertical control applied during an avoidance maneuver.

According to an optional aspect illustrated by FIG. 13, the processing module 14 is able to implement a calculation configured to consider a vertical dimension by using a vertical profile of the associated obstruction $\mathbf{0}_{13}$ associated, as a function of the alert level previously defined, with an immediate avoid maneuver $E_1$, or an evasive avoid maneuver $E_2$. Such a profile accounts for actual current performance levels of the aircraft 62. To that end, it is necessary for the on-board sensors to provide the elevation of the obstruction and for the obstruction to be fixed to the ground 68 (such a calculation being meaningless for a movable obstruction).

According to one particular aspect, when the processing module 14 is able to determine that the evasive maneuver $E_2$ is able to pass beyond the obstruction $\mathbf{0}_{13}$ whose height is increased by a margin $M_a$, then the level of the obstruction $\mathbf{0}_{13}$ subject to the alert is automatically downgraded. On the contrary, when the processing module 14 is able to determine that the evasive maneuver $E_2$ enters into a conflict with the obstruction $\mathbf{0}_{13}$ whose height is increased by a margin $M_a$, then the associated alert level is maintained. Furthermore, when the processing module 14 is able to determine that the immediate avoid maneuver $E_1$ is in conflict with the obstruction height increased by a margin $M_a$, the alert corresponding to the maximum alert threshold requiring an avoid is transmitted.

The information delivered by the alert processing has a higher priority than that relative to the risk level evaluation processing; these two pieces of information are therefore considered mutually exclusive.

As an optional addition, the data processing module 14 is able to implement processing supplying information representative of a drift of the aircraft, depending on the type of sensor technology used.

Such processing to supply information representative of a drift of the aircraft is in particular useful for missions during which the aircraft experiences a brownout/whiteout present over a landing/takeoff area by maintenance of an aircraft, in particular a rotary-wing aircraft, hovering, where in case of wind, the aircraft is able to move without the pilot having the ability to detect it, since he may lose his visual points of reference due to the brownout/whiteout.

According to a first variant, such processing to supply information representative of a drift of the aircraft consists of determining, in real time, a relative movement of the aircraft with respect to its environment by using the man-machine interface 30 connected to the anti-collision device 10. Through the symbology shown in FIG. 17, for example, the anti-collision device is able to show the evolution of the situation to the pilot of the aircraft. It is thus possible to show the distance variation between the aircraft and the obstructions and to indicate (by comparison of the position of the aircraft with the stationary obstructions identified by the various sensors) a ground speed vector to the crew.

According to a second variant, when the aircraft is placed in stationary mode (information supplied by a third-party avionics device of the aircraft or by the pilot himself via the MMI 30), characterized by a non-nil height with respect to the ground and a substantially nil ground speed, the data processing module 14 is able to compare the evolution of the surrounding scene to the level of the ground, and in particular the position of the aircraft with respect to obstructions identified as stationary. If the position evolves by more than a certain distance (configurable and for example corresponding to a rotor radius), information representative of a drift of the aircraft is automatically escalated to the crew.

The data processing module 14 therefore provides, as output, a synthesis of the environment in terms of obstructions identified and monitored over time with their characteristics, namely an identifier of the obstruction, a position of the obstruction, the sensor(s) having detected the obstruction, the size of the obstruction, the likelihood of existence of the obstruction, the elevation of the obstruction, depending on the type of sensor, the risk evaluation, the alert level, and optionally, information representative of a drift of the aircraft.

The supervision module 20 is configured to adapt the behavior of the sensors and the anti-collision device 10 as a function of the situation of the aircraft.

In other words, the supervision module 20 is tasked with managing the various sensors $S_1, S_2, \ldots, S_i, \ldots S_N$, by inhibiting/reducing the transmission power, as a function of configuration parameters D1, operational modes 24, the current flight phase D2 and the technology of the various sensors, it will inhibit/reduce the transmission power of the concerned sensors.

Such management implemented by the supervision module 20 makes it possible to:
- avoid nuisances encountered during specific flight phases, for example a winching phase (where it is useful to inhibit the sensors facing towards the front of the aircraft or to reduce the transmission power thereof until stopping, since such sensors risk producing false alerts), or encountered during specific operating modes, for example the "set down skids" mode, the "tactical flight" mode are activated;
- protect people working near the aircraft by modulating the power level emitted by each sensor: active technologies like laser-based or radar-based technologies being able to cause serious injuries in more or less short periods (blindness in the case of lasers, cancer in the case of radar waves in particular), while respecting the maximum exposure limits required by the regulations in force;
- limit the exposure of the aircraft to outside detections, in particular for a "tactical flight" mode, where the active sensors are able to favor the identification/location of the aircraft, by reducing the emission level of certain sensors or activation of a pulsed operating mode (active during a limited time period, then inactive, then active again, etc.);
- prevent the anti-collision device 10 from disrupting the operation of electronic equipment distinct from the aircraft such as astronomical observatories, the frequency range of which is identical to that of sensors corresponding to millimetric radars by cutting the emissions of these sensors in the installation areas of these sensors.

Such management implemented by the supervision module is done from configuration data $D_1$ in particular containing, for each sensor, an identifier of the sensor, the technology of the sensor, the position of the sensor on the aircraft, the field of vision, the power level emitted by functional mode 24, the power level emitted by flight phase $D_2$, the functional modes 24 for which the sensor is inhibited/cut, the flight phases $D_2$ for which the sensor is inhibited/cut, a local database 32 (specific to the mission) or broader surface area (worldwide, for example) containing the areas for which the use of particular sensor technology is excluded.

The supervision module 20 is able to use this database as well as the flight phases and other flight parameters $D_2$ of the machine (position, for example) and able to send the necessary commands to the concerned sensor(s) via the physical interface for linking to the sensor(s) in order to reduce their power or to stop them completely.

According to one particular aspect, the supervision module 20 is also able to modulate the outputs of the display module 34 and/or of the sound retrieval module 36 as a function of the activated functional mode 24 and/or the flight phase $D_2$. For example, in exclusive display mode, only the outputs of the display module 34 are activated; the outputs of the sound retrieval module 36 are inhibited.

The display module 34 is responsible for the graphic depiction of the situation in real time of the aircraft and the maneuvering margin that it may have, accompanied, if applicable, by the production of visual alerts, and sound alerts by the sound retrieval module 36.

Such a graphic depiction may assume several forms illustrated by FIGS. 14 to 17.

Figure 14:
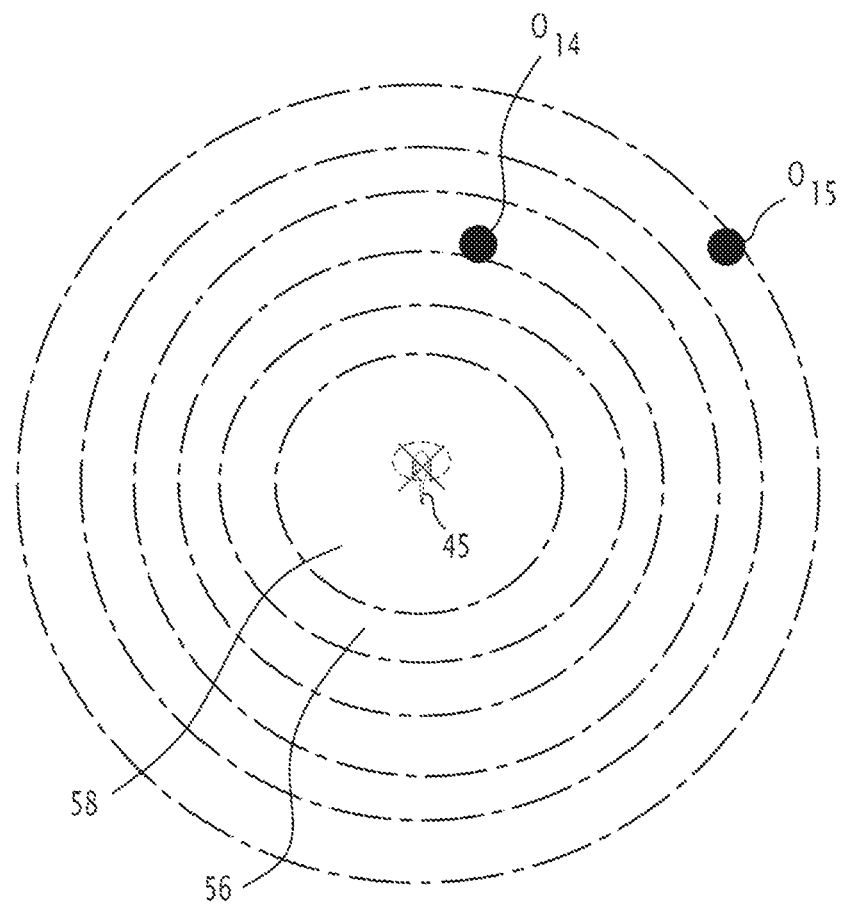

FIG. 14 is an exemplary graphic illustration including the location of the various obstructions $O_{14}$ and $O_{15}$ located in the field of vision of the various sensors $S_1, S_2, \ldots, S_i, \ldots S_N$. According to one particular aspect, different colors are used to highlight the most risky obstructions (obstruction moving closer or further away, obstruction located at the same height or below the aircraft).

Figure 15:
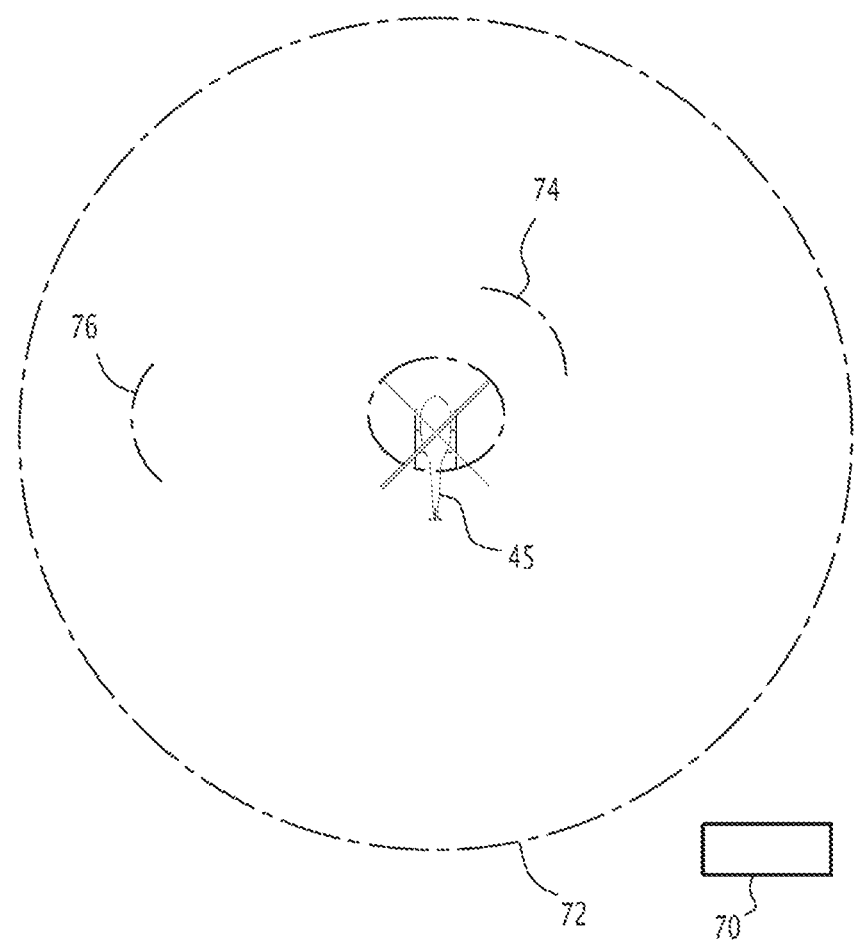

FIG. 15 is an exemplary graphic illustration providing, in the surveillance area 72, sensors $S_1, S_2, \ldots, S_i, \ldots S_N$, direction information 74, 76 by obstruction, and distance information 70.

Figure 16:
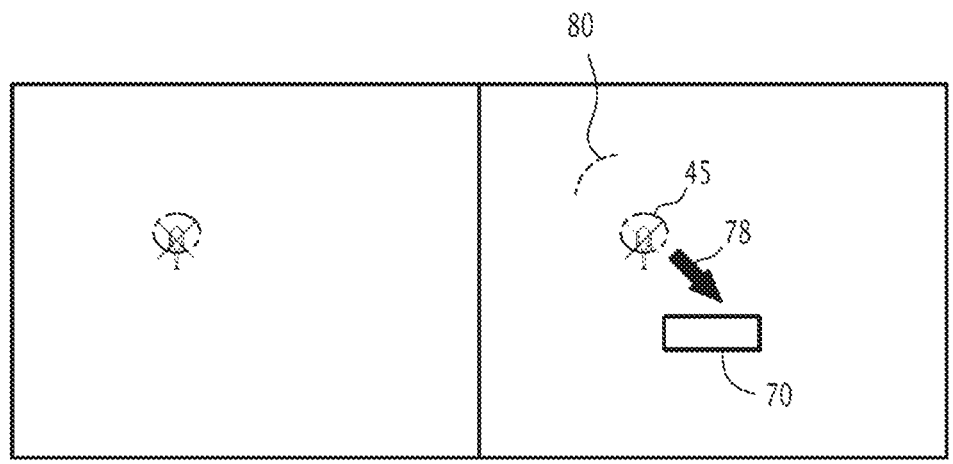

FIG. 16 is a clean exemplary graphic illustration for a head-up system, for example, where only the direction 78 of the closest obstruction as well as the distance 70 separating it from the aircraft 45. According to one optional aspect, the direction 80 in which a second closest obstruction is located is added.

According to an additional aspect that is not shown, the provision of the position of different risk thresholds and the distance between the aircraft (end of the blades, for example, in the case of a helicopter) and the closest obstruction are also shown. In case of high collision risk, the color of the distance information or that of the obstruction can be adapted (red instead of amber, for example, to indicate urgency). The areas where the anti-collision device is "blind" (that is to say, white area) can also be depicted in the form of crosshatched sectors, for example.

As a non-limiting example, the table in FIG. 17 proposes an example of symbols making it possible to separate the stationary obstacles from the moving obstacles, to show the movement direction of the moving obstacles and the evolution of the inter-distance between the obstructions and the aircraft.

The sound retrieval module 36 is in turn able to retrieve, in the form of an audio signal, a collision risk alert, for example by using a synthetic voice announcing that each threshold has been crossed and the direction of the closest obstruction, or an audio signal whose frequency and/or intensity reflects the proximity and the direction of the obstruction. To that end, the sound retrieval module 36 directly incorporates an audio retrieval element or is connected with an offboard element of the earpiece type, for example.

FIGS. 18 to 21 illustrate different architecture examples of the avionics protection system according to the invention.

Figure 18:
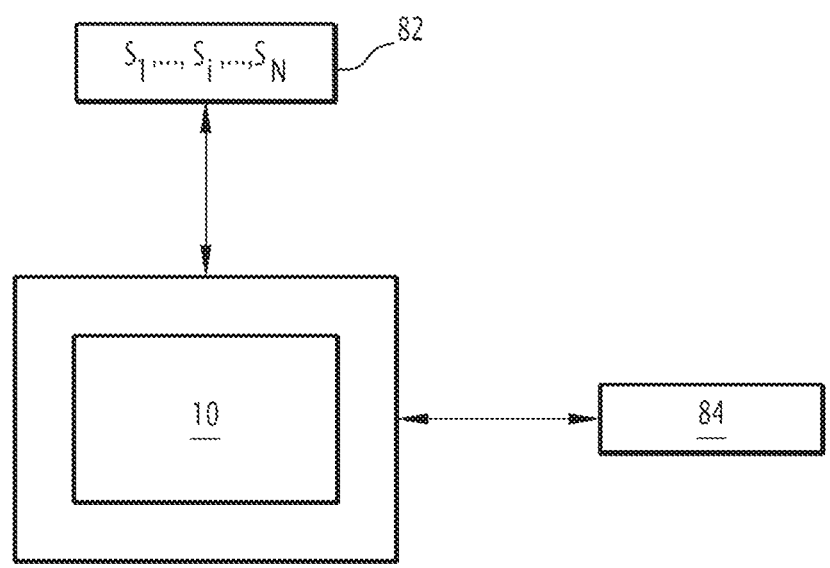
FIGS. 18 to 21 illustrate different architecture examples of the avionics protection system according to the invention.

FIG. 18 shows a first "basic" architecture in which the anti-collision device 10, 38 according to the present invention is a standalone device. According to this first basic architecture, the plurality 82 of sensors $S_1, S_2, \ldots, S_i, \ldots S_N$ are installed on the aircraft and are able to provide the captured data to the anti-collision device 10, 38, which directly delivers, as output, to the crew 84 in visual and/or audio form, information representative of the presence or absence of an obstruction. According to this basic architecture, the anti-collision device 10, 38 is not coupled to other data sources, such as a surveillance device (e.g., a terrain awareness and warning system TAWS) and, for example, is not able to anticipate the attitude changes of the aircraft. According to this basic architecture, the anti-collision device 10, 38 for example corresponds to an electronic flight bag (EFB), a head-up display (HUD) or a dedicated computer.

Figure 19:
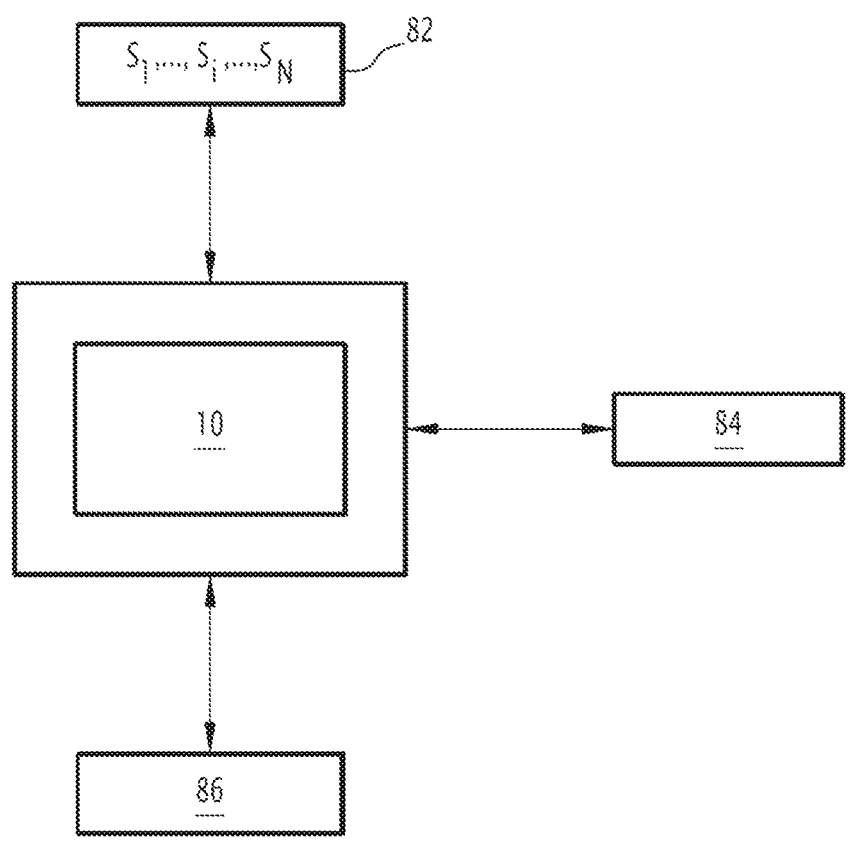

FIG. 19 shows a second "augmented" architecture in which the anti-collision device 10, 38 is, compared with the basic architecture described previously in connection with FIG. 18, coupled to (that is to say, able to cooperate with, receive and/or exchange data with) a set 36 of other avionics instruments, such as a geolocation instrument (e.g., a GPS system for satellite geolocation), an air data computer (ADC) or anemometric computer, an attitude and heading reference system (AHRS), a radio altimeter, etc., with the aim of increasing the relevance of the information generated by the anti-collision device 10, 38 for the entire crew 84. Such an avionics protection system according to the augmented architecture of FIG. 19, in addition to the capabilities of the avionics protection system according to the basic architecture of FIG. 18, is therefore also able to recover the flight data of the aircraft, namely speed, position, altitude, etc. in order to optimize the relevance of the information, generated according to the invention, and representative of the presence or absence of an obstruction.

Figure 20:
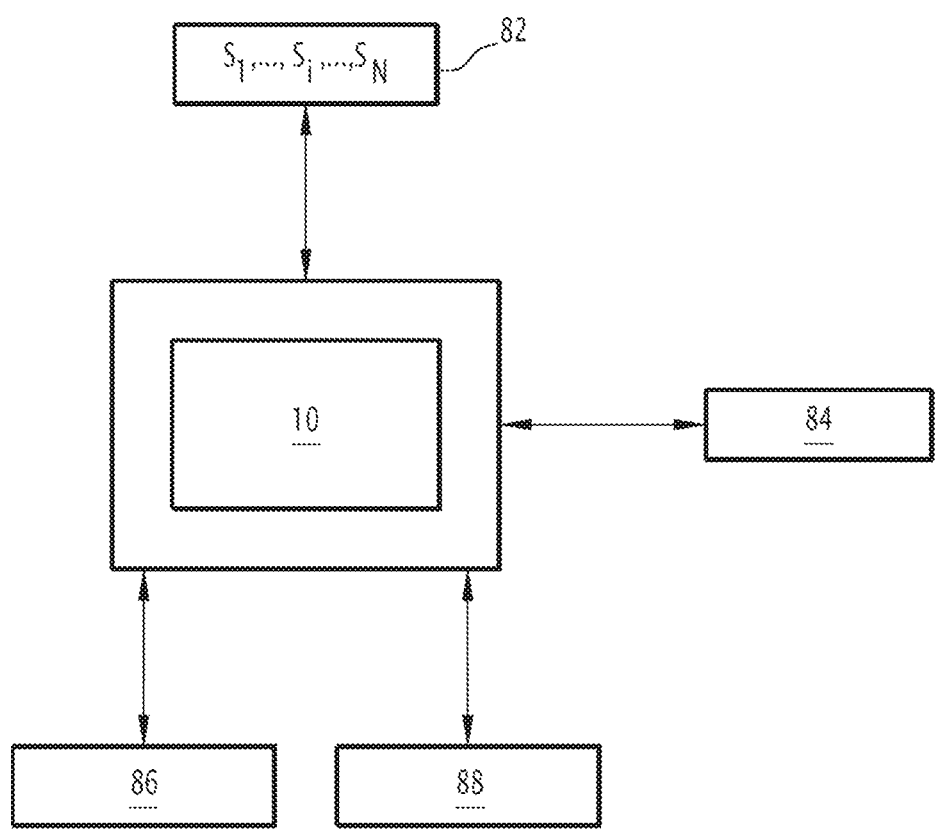

According to a third example of "coupled" architecture illustrated in FIG. 20, the augmented architecture of FIG. 19 is enhanced by the coupling to a surveillance system 88 integrated into the aircraft (ISS, Integrated Surveillance System) in particular comprising an avionics terrain awareness and warning system (TAWS or HTAWS, Terrain Awareness & Warning System or Helicopter Awareness & Warning System), which makes it possible, in addition to the anti-collision device 10, 38, to recover information supplied directly by the surveillance system, such as flight phases, operational modes, etc. According to this "coupled" architecture, the man-machine interface 30 is shared by both devices, namely the anti-collision device 10, 38 according to the invention and the TAWS device.

According to this third architecture, the terrain awareness and warning system and the anti-collision device are therefore configured to interact (i.e., listening to one another).

The coupling implemented in this third architecture "is equivalent to" coordination so as to increase the protection cases of the aircraft as much as possible, the terrain awareness and avoidance system and the anti-collision device being able, for example, to operate independently of one another by using at least one input datum of the same type as an activation/deactivation datum. For example, from the "flight phase" datum, the terrain awareness and avoidance system is activated in the cruising phase and deactivated for takeoff/landing, during which flight phases the anti-collision device according to the invention is activated.

Figure 21:
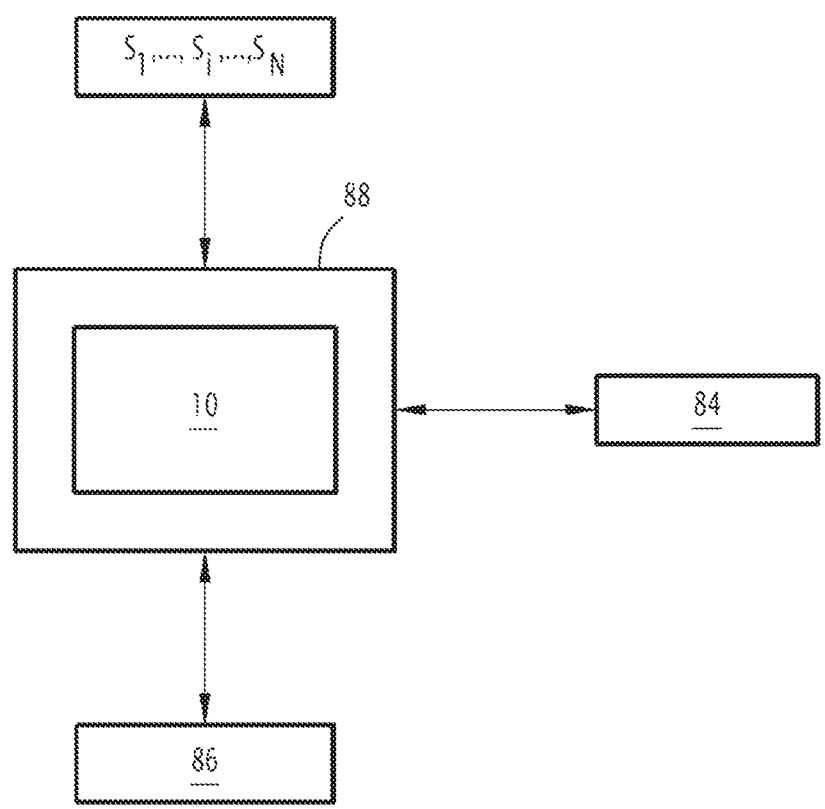
Figure 22:
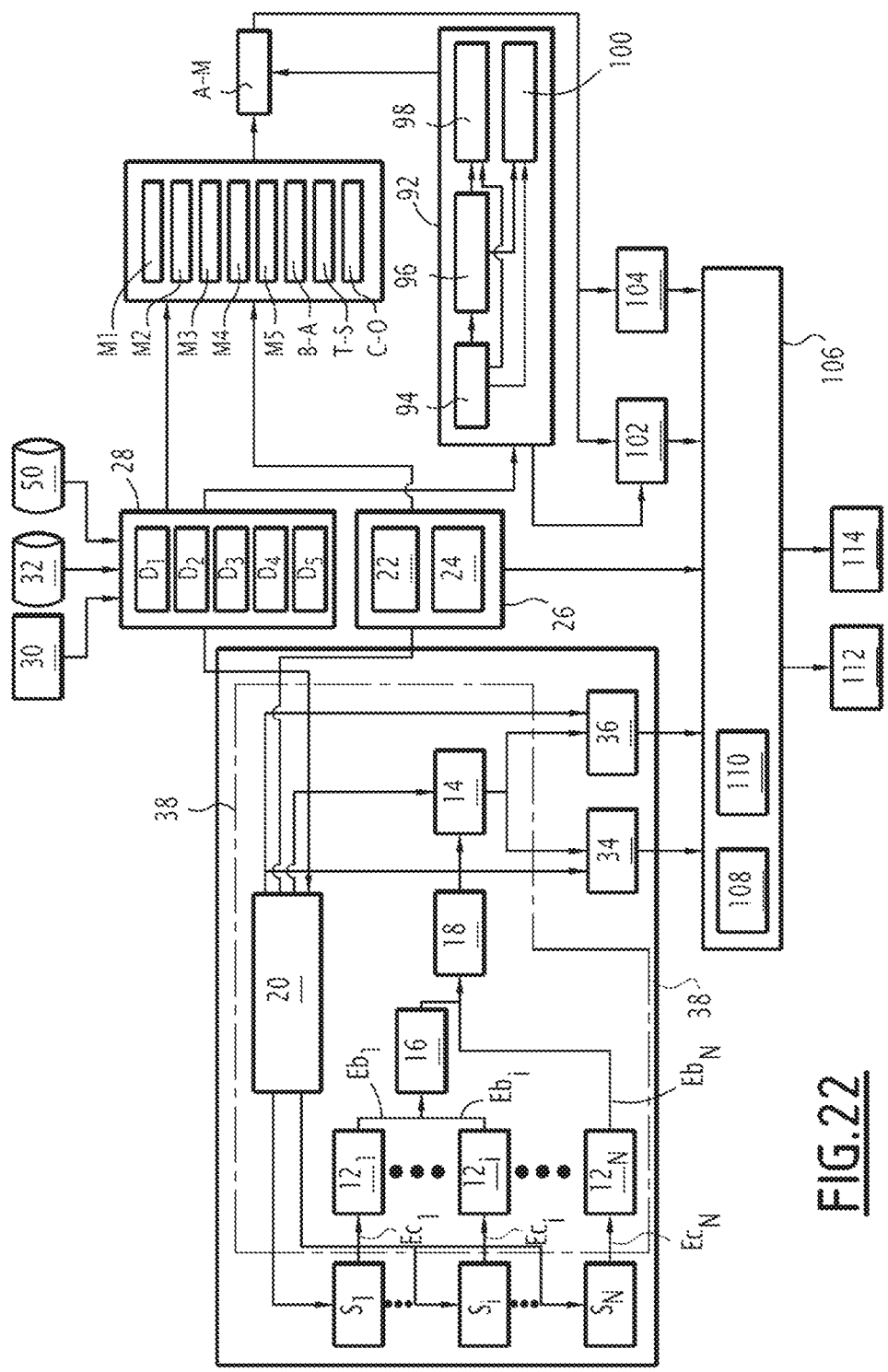
FIG. 22 is a detailed schematic illustration of the architecture example of FIG. 21.

FIG. 21 shows a fourth architecture where the anti-collision device 10, 38 according to the invention is incorporated directly into a surveillance system 88 integrated into the aircraft in particular comprising an avionics terrain awareness and avoidance system. The structure of such an integration is shown schematically in FIG. 22, and corresponds to the set of elements of the anti-collision device of FIG. 1 merged with the set of elements conventionally associated with a TAWS device.

"Merged" means that elements such as the piloting mode management module 26, the module 28 for managing input parameters, the interface 30 for entering piloting command(s) and the database 32 are shared by the anti-collision device and the TAWS device.

The module 28 for managing input parameters is for example enhanced with a fifth category $D_5$ of data more specific to the TAWS device, namely digital models of the terrain and obstructions stored beforehand.

Such a fifth category $D_5$ is coupled to a database 90 specific to such digital terrain and obstruction models.

For the TAWS device, the module 28 for managing input parameters conventionally supplies a module for managing reactive modes among, for example, predefined reactive modes $M_1, M_2, M_3, M_4, M_5$, "incline angle" B-A, "tail strike risk" T-S, a "callout" mode C-O. The reactive mode management module 28 is able to deliver, to an alert management module A-M, a reactive mode selected as a function of input parameters and the output delivered by the piloting mode management module 26. The alert management module A-M is also supplied by a mode predicting module 92 comprising at least one sensor 94, a element 96 predicting a collision with the terrain, an element 98 predicting a collision with an obstacle distinct from the terrain, an element 100 for linear prediction of collision with an obstacle distinct from the terrain. The outputs of the alert management module A-M and the mode prediction module 92 are able to be retrieved by a display module 102 and/or by a sound retrieval module 104.

The assembly formed by the anti-collision device and by the TAWS or HTAWS device is controlled by a supervision device 106 configured to command the activation/deactivation of the modules specific to the terrain awareness and warning system and the activation/deactivation of the modules specific to the anti-collision device using an input datum of the same type, for example a flight phase, a pilot command, an external system command of the "flight management system (FMS) command" type, etc.

To that end, the supervision device 106 in particular comprises a module 108 for global surveillance of the situation of the aircraft and an alert supervisor 110 configured to arbitrate/select the visual and oral information from the anti-collision device according to the invention and/or from the TAWS or HTAWS device in order to choose the most relevant information to present based on the flight phase/the engaged functional mode to the crew using a display module 112 and/or a sound retrieval module 114.

The supervision device 106 is also able to manage any overlap in terms of protection as well as the priorities between the different information to be escalated to the crew.

Figure 23:
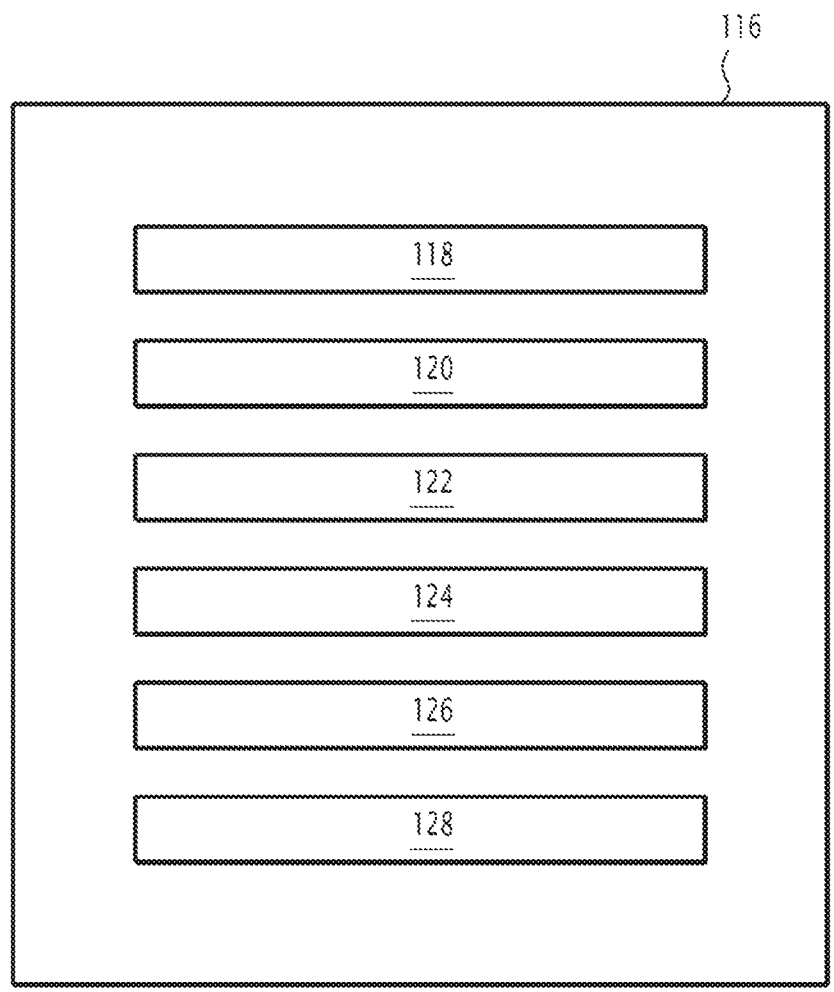
FIG. 23 is a flowchart of an anti-collision method according to the invention.

In connection with FIG. 23, the anti-collision method 116 according to the invention escalated by the anti-collision device 10, 38 comprises a first optional supervision step 118 for commanding (i.e., activating/deactivating, modulating the transmission power, etc.) the N sensors $S_1, S_2, \ldots, S_i, \ldots S_N$ as a function of at least one input parameter of the categories $D_1$ to $D_4$ previously described, each sensor $S_1, S_2, \ldots, S_i, \ldots S_N$ respectively being able to deliver its own set of captured data $S_1, S_2, \ldots, S_i, \ldots S_N$ as a function of the proximity of at least one obstruction.

According to a step 120, the anti-collision device 10 implements an homogenization of the data specifically detected by each sensor to respectively deliver a set of unmarked (that is to say, generic) data made up of a plurality of identical data types from one set of unmarked data to another.

According to one optionally step 122, the anti-collision device 10, 38 implements a completion module making it possible to complete, from a set of unmarked data $Eb_i$ associated with one of the sensors $S_i$, at least one missing value associated with a type, from the plurality of identical data types of a set of unmarked data $Eb_j$ of another sensor $S_j$ of the plurality of sensors $S_1, S_2, \ldots, S_i, \ldots S_N$ of the aircraft.

According to another optional step 124, the anti-collision device 10, 38 implements a preprocessing operation making it possible to merge the data from all of the sets of unmarked data $Eb_1, Eb_2, \ldots, Eb_i, \ldots Eb_N$ as a function of a detection area associated with each sensor $S_1, S_2, \ldots, S_i, \ldots S_N$ and to send them to the data processing module 14, and if applicable during which the following is or are applied: time filtering to each set of unmarked data $Eb_1, Eb_2, \ldots, Eb_i, \ldots Eb_N$ so as to eliminate the data associated with an obstruction whose presence duration near the aircraft is below a predetermined threshold, and/or a comparison of the merger of the data from all of the sets of unmarked data $Eb_1, Eb_2, \ldots, Eb_i, \ldots Eb_N$ to a merged data history stored beforehand.

According to a step 126, the anti-collision device 10, 38 implements a processing operation of the generic data, corresponding directly, or obtained from the unmarked data, to generate at least one piece of information representative of the presence or absence of obstruction (s).

According to a step 128, the anti-collision device 10, 38 implements a step for retrieving, for the crew or at least for the pilot, information representative of the presence or absence of obstruction(s).

Thus, the anti-collision device and the anti-collision method according to the invention, coupled or not coupled to a TAWS or HTAWS device, make it possible to improve the safety of the aircraft by covering the situation where the aircraft operates, for example, at a low speed with small lateral and vertical separation margins relative to stationary or moving artificial obstacles located nearby (takeoff, landing, hovering and taxi phases), but also the so-called low level flight phases where the aircraft operates near the ground, while doing away with the origin and technology of the sensors used, which are taken advantage of through the anonymization of the interface between the sensors and the functional core 14 of the anti-collision device 10, 38 according to the invention.

The invention claimed is:

1. An anti-collision device of an aircraft comprising a plurality of sensors, the plurality of sensors comprising at least two separate sensors, each sensor being configured to respectively deliver its own set of captured data as a function of a proximity of at least one obstruction,
    wherein the anti-collision device comprises:
    at least one data homogenization module configured to transform at least one set of captured data in a corresponding set of unmarked data, each set of unmarked data respectively associated with at least one sensor being made up of a plurality of identical data types from one set of unmarked data to another,
    a data processing module configured to generate, from the sets of unmarked data, at least one piece of information representative of a presence or absence of obstruction(s), and
    a data preprocessing module at least configured to merge data from all of the sets of unmarked data as a function of a detection zone associated with each sensor and sending them to the data processing module, or
    a supervision module configured to command the plurality of sensors as a function of at least one input parameter selected from a group consisting of:
    a sensor configuration parameter;
    a flight parameter of the aircraft;
    a parameter representative of at least one mission of the aircraft;
    a parameter representative of a piloting command entered by a pilot of the aircraft;
    information representative of a current flight phase of the aircraft; and
    a parameter representative of an operational piloting mode.

2. The anti-collision device according to claim 1, wherein the plurality of identical data types comprises, in the presence of a detected obstruction, at least three data types including:
    at least one datum representative of an obstruction position;
    at least one datum representative of a likelihood of obstruction detection; and
    at least one datum representative of an obstruction size.

3. The anti-collision device according to claim 1, further comprising a completion module configured to complete, from a set of unmarked data associated with one of the plurality of sensors, at least one missing value associated with a type, from the plurality of identical data types of a set of unmarked data of another sensor of the plurality of sensors of the aircraft.

4. The anti-collision device according to claim 1, wherein the data preprocessing module is further configured to apply temporal filtering to each set of unmarked data eliminating data associated with an obstruction whose presence duration near the aircraft is below a predetermined threshold.

5. The anti-collision device according to claim 1, wherein the data preprocessing module is further configured to compare the merged data of all of the sets of unmarked data to a history of merged data previously stored.

6. The anti-collision device according to claim 1, wherein when at least one of the plurality of sensors of the aircraft is configured to determine a relative speed of an obstruction, the data processing module is also configured to generate information representative of a presence or absence of drift of the aircraft during hovering.

7. An avionics system for protecting an aircraft, comprising:
 a terrain awareness and warning device and the anti-collision device according to claim 1, the terrain awareness and warning device and the anti-collision device each being configured to be activated/deactivated according to a predetermined degree of activation/deactivation from at least one input datum of a same type.

8. An anti-collision method of an aircraft comprising a plurality of sensors, the plurality of sensors comprising at least two separate sensors each sensor being configured to respectively deliver its own set of captured data as a function of a proximity of at least one obstruction, the anti-collision method being implemented by an anti-collision device and comprising at least:
 homogenizing data of each set of captured data in a corresponding set of unmarked data, each set of unmarked data respectively associated with each sensor being made up of a plurality of identical data types from one set of unmarked data to another,
 generating, by a data processor from said sets of unmarked data, at least one piece of information representative of a presence or absence of obstruction(s), and
 merging, by a data preprocessor, data from all of the unmarked data sets as a function of a detection zone associated with each sensor and sending them to the data processor, or
 commanding, by a supervision module, the plurality of sensors as a function of at least one input parameter selected from a group consisting of:
  a sensor configuration parameter;
  a flight parameter of the aircraft;
  a parameter representative of at least one mission of the aircraft;
  a parameter representative of a piloting command entered by a pilot of the aircraft;
  information representative of a current flight phase of the aircraft; and
  a parameter representative of an operational piloting mode.

9. A non-transitory computer-readable storage medium comprising software instructions which, when executed by a computer, carry out the anti-collision method according to claim 8.

* * * * *